US011927330B2

(12) United States Patent
Incikaya et al.

(10) Patent No.: US 11,927,330 B2
(45) **Date of Patent: *Mar. 12, 2024**

(54) TELESCOPING PERIMETER LIGHTING FIXTURE AND INSTALLATION METHODS

(71) Applicant: GAMMALUX SYSTEMS, INC., San Dimas, CA (US)

(72) Inventors: Philip Incikaya, San Dimas, CA (US); Daniel Aulisio, San Dimas, CA (US)

(73) Assignee: GAMMALUX SYSTEMS, INC., San Dimas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/860,789

(22) Filed: Jul. 8, 2022

(65) Prior Publication Data

US 2023/0026829 A1 Jan. 26, 2023

Related U.S. Application Data

(63) Continuation of application No. 17/362,779, filed on Jun. 29, 2021, now Pat. No. 11,384,923.

(51) Int. Cl.

| | |
|---|---|
| ***F21V 21/22*** | (2006.01) |
| ***F21S 4/28*** | (2016.01) |
| ***F21V 19/00*** | (2006.01) |
| *F21Y 115/10* | (2016.01) |

(52) U.S. Cl.

CPC ................ *F21V 21/22* (2013.01); *F21S 4/28* (2016.01); *F21V 19/003* (2013.01); *F21Y 2115/10* (2016.08)

(58) Field of Classification Search

CPC ........ F21V 19/003; F21V 21/122; F21S 4/28; F21Y 2115/10

See application file for complete search history.

(56) References Cited

U.S. PATENT DOCUMENTS

| | | | | |
|---|---|---|---|---|
| 6,736,522 | B1 | 5/2004 | Cini | |
| 8,794,795 | B2 | 8/2014 | Yaphe et al. | |
| 10,208,933 | B1 | 2/2019 | Seligman et al. | |
| 10,663,118 | B1 | 5/2020 | Hsu | |
| 11,384,923 | B1 * | 7/2022 | Incikaya | F21S 4/28 |

(Continued)

FOREIGN PATENT DOCUMENTS

CA 2821751 A1 2/2014

OTHER PUBLICATIONS

Finelite Better Lighting Perimeter Slot FL_HP2WS_Presentation, 20 pages.

(Continued)

*Primary Examiner* — Anabel Ton

(74) *Attorney, Agent, or Firm* — Perkins Coie LLP

(57) ABSTRACT

A lighting fixture includes a mounting rail slidably attached to a first side of a main section. A lighting assembly includes a first LED board attached to the main section, and a second LED board attached to an extension movable longitudinally relative to the main section. The extension may be attached to the mounting rail and be slidable longitudinally relative to the main section, to extend the length of the lighting fixture. The second LED board may be supported on a slider extrusion rigidly attached to a spacer on the main section. The lighting fixture can be more quickly and easily installed with minimal field cutting of components.

15 Claims, 18 Drawing Sheets

(56) References Cited

U.S. PATENT DOCUMENTS

| | | | |
|---|---|---|---|
| 2003/0174517 | A1 | 9/2003 | Kiraly et al. |
| 2013/0279160 | A1 | 10/2013 | Myers et al. |

OTHER PUBLICATIONS

Finelite HP-2WS Perimeter Slot; Jun. 6, 2017.
Finelite; HP-WS Perimeter Lighting; Jun. 6, 2017; https://www.youtube.com/watch?v=dsfjyIWEiCs.
Focal Point FSM4PR_IS0725_1 Seem 4 LED Perimeter Installation Instructions, 2021, 9 pages.
Focal Point Seem 4 LED Perimeter Grid/Trimless Drywall Instructions; Oct. 1, 2019.
Focal Point; Seem 4 LED Perimeter Installation Instructions; Oct. 1, 2019; https://www.youtube.com/watch?v=vStahn06xwE.
Lumenwerx perimeter sleeve tutorial; Apr. 4, 2017; https://www.youtube.com/watch?v=COdTk0S6nQg.
Lumenwerx Via Perimeter 3-5 End Sleeve Adjustment Instructions; Nov. 16, 2019.
Lumenwerx VIA-3-5-PERIMETER-END-SLEEVE-ADJUSTMENT-INST, Nov. 16, 2019, 3 pages.

* cited by examiner

TELESCOPING PERIMETER LIGHTING FIXTURE AND INSTALLATION METHODS

CROSS-REFERENCE TO RELATED APPLICATION(S)

This application is a continuation of U.S. patent application Ser. No. 17/362,779, filed Jun. 29, 2021, titled "TELESCOPING PERIMETER LIGHTING FIXTURE AND INSTALLATION METHODS," the entirety of which is incorporated by reference.

BACKGROUND OF THE INVENTION

Linear lighting fixtures have been successfully used for many years. These types of lighting fixtures are commonly used primarily in interior spaces where uniform lighting and aesthetics are significant considerations. Arrays of LEDs in the lighting fixtures provide light with selected characteristics. Linear lighting fixtures may be manufactured in various lengths, with multiple fixtures placed end-to-end to provide an overall desired length. In some installations, the length of the fixtures is not critical. However, in other situations, the lighting fixture must be fit precisely into a defined space, such as a space between two walls of a room, or in a space limited or obstructed by ventilation, electrical or plumbing conduits, structural columns, and/or other architectural elements.

Challenges arise in installing linear lighting fixtures because the defined space often varies, due to varying dimensions caused by imprecise construction, non-flat or out-of-alignment walls or surfaces, and other factors. As a result, even if provided with multiple lighting fixtures of varying fixed lengths, installers are often not able to easily locate the lighting fixtures as desired. This can cause uneven room lighting and/or gaps and dim areas, degrading the overall appearance of the room.

To compensate for variations in wall length or other defined spaces and obstacles in the building, telescoping linear lighting fixtures have been proposed and used. Telescoping lighting fixtures allow the installer to adjust the length of the lighting fixture as needed. However, certain telescoping lighting fixtures may still require extensive field cutting, and/or precision cutting, of lighting fixture components, or have other drawbacks. As a result, even with telescoping lighting fixtures, installation can be time consuming and require significant levels of skill and experience, with associated higher overall costs. Accordingly, an improved linear telescoping lighting fixture, and installation methods, are needed.

Perimeter lighting fixtures are lighting fixtures typically installed in the ceiling at the perimeter or walls of a room. While the perimeter lighting fixtures themselves are largely concealed in or above the ceiling, these types of lighting fixtures can provide attractive and uniform lighting. Providing continuous perimeter lighting requires that the perimeter lighting fixtures adjoin each other at the corners of the room. Consequently, as with various other linear lighting fixtures, perimeter lighting fixtures can be difficult and time consuming to install because wall lengths may vary, and there may be unforeseen obstacles from construction of the building interfering with the installation. Accordingly, improvements in linear perimeter lighting fixtures and installation methods are needed.

SUMMARY

In a first aspect, a lighting fixture includes a mounting rail slidably attached to a first side of a main section of the lighting fixture. A lighting assembly in the fixture includes a first LED board attached to the main section, and a second LED board attached to an extension section of the lighting fixture and movable longitudinally relative to the first LED board. The extension may be attached to the mounting rail and can slide longitudinally relative to the main section, to extend the length of the lighting fixture.

The lighting assembly may be supported by at least one amounting base extending down from a top of the fixture, with first and second retainer arms pivotally attached to a lower end of the mounting base and engaged into a spacer slot in a spacer supporting the first LED board. The second LED board may be slidably attached to or supported on a slider extrusion rigidly attached to the spacer. A cover is optionally provided, attached to the extension and extending into the main section.

A method of installing an extendible lighting fixture may include hanging the extendible lighting fixture onto a wall rail by placing a mounting rail of the lighting fixture onto or into the wall rail. The length of the lighting fixture is adjusted to fit into a defined space by sliding an extension of the lighting fixture away from a main section of the lighting fixture. This causes a second LED board attached to the extension to automatically and simultaneously slide out relative to a first LED board on the main section. The installer may hang the lighting fixture, adjust the length of the lighting fixture, make electrical connections, and then move on to install another fixture. The remaining mechanical steps, which by design are fast and easy to perform, may be left for an assistant to complete the installation.

The installer and/or the assistant may optionally mechanically connect the main section to the adjacent lighting fixture, and attach a drop flange element to the main section and to the extension. If used, the drop flange element may provide a uniform appearance to the extended fixture, and a horizontal lip to support ceiling tiles. First and second lens flanges may be installed between the main section and the extension to help support the lens of the extended fixture.

Other objects and features will be apparent to those skilled in the art from the following detailed description and drawings, which show multiple embodiments. The drawings are provided as examples of the designs and methods of the invention, and are not intended as a statement of limitations on the scope of the invention.

DETAILED DESCRIPTION OF THE DRAWINGS

Figure 1:
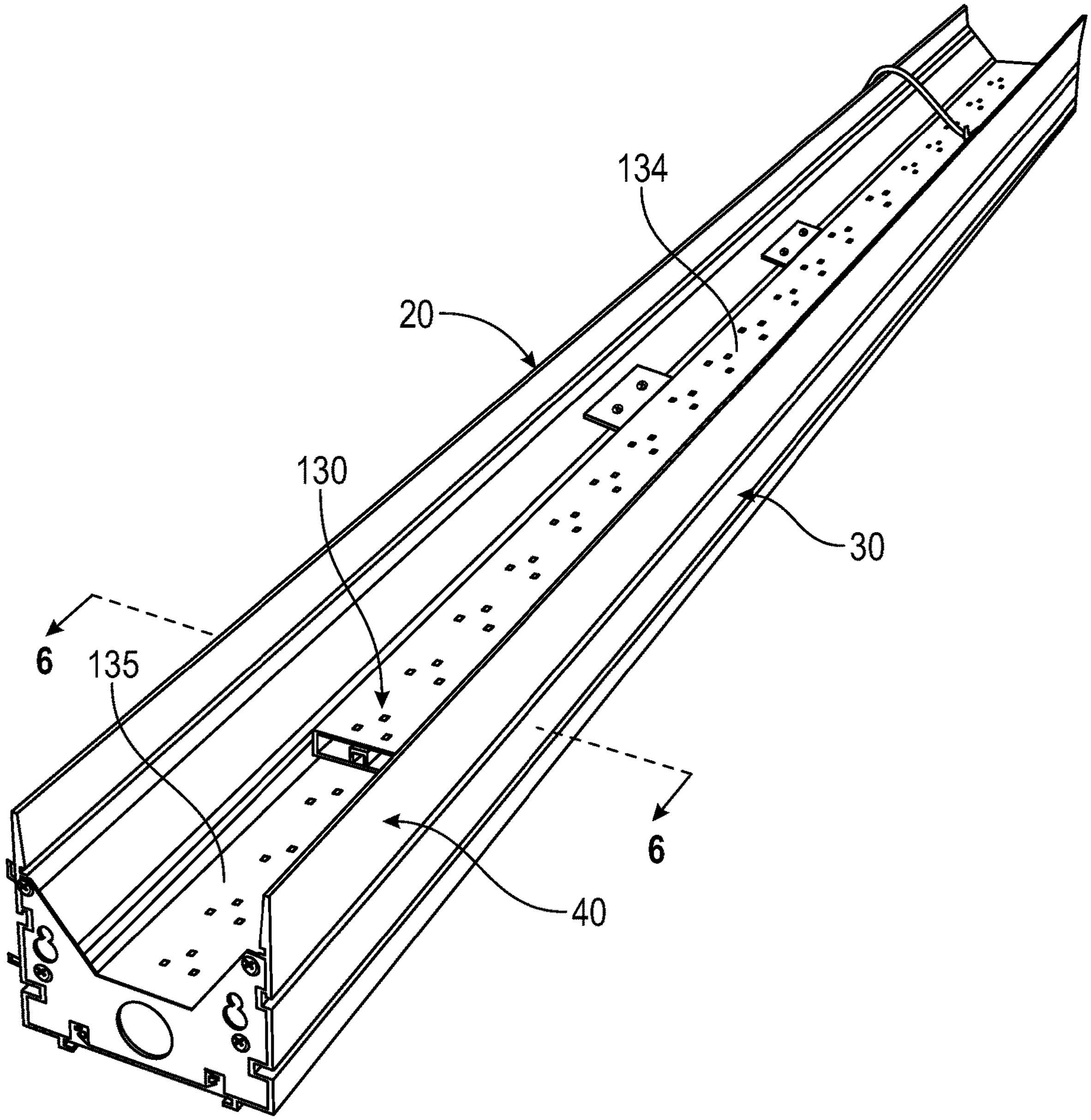
FIG. 1 is a perspective view of the telescoping linear lighting fixture in an un-extended position.
Figure 2:
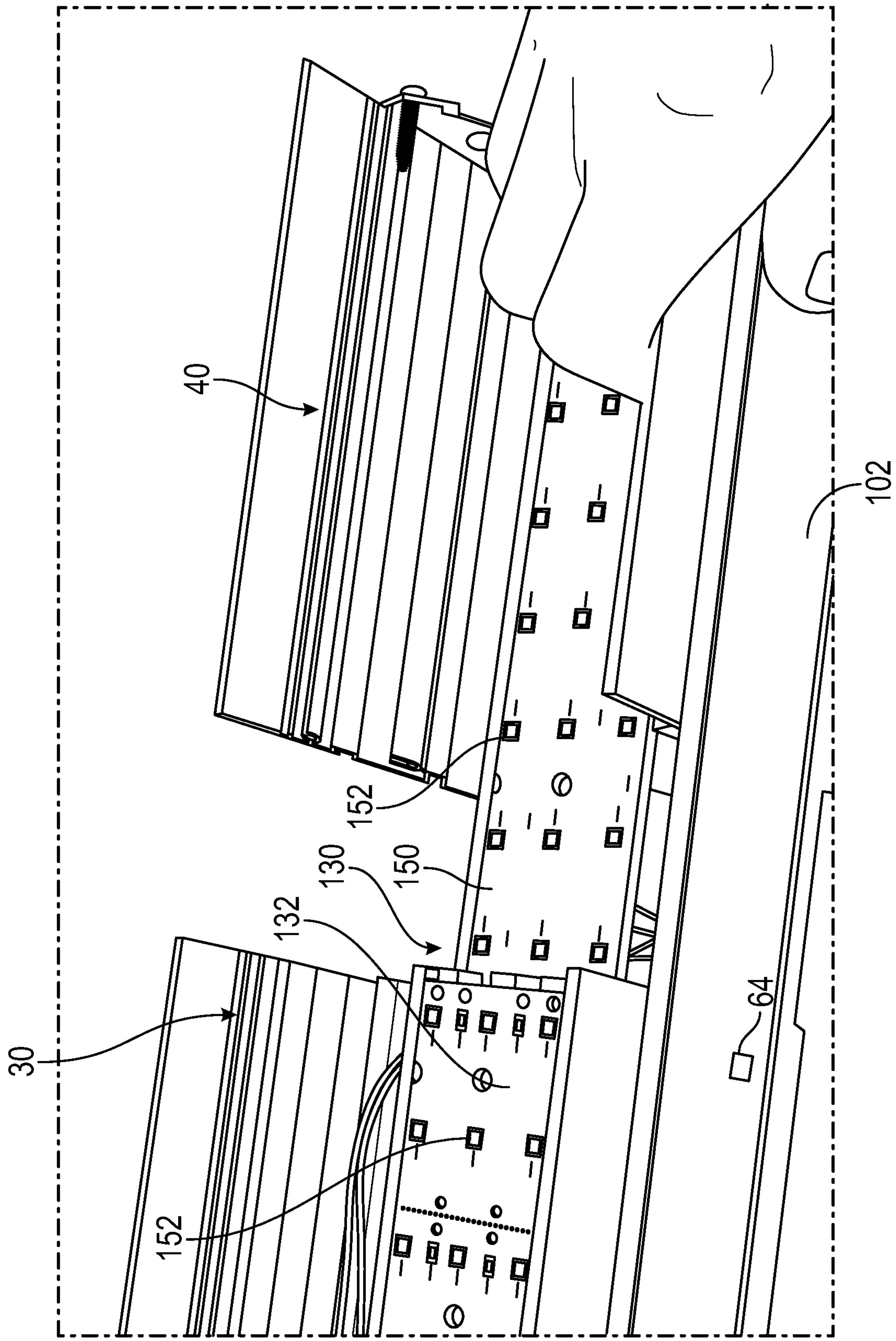
FIG. 2 is a perspective view of the telescoping linear lighting fixture of FIG. 1 in a partially extended position.

As shown in FIGS. 1 and 2, a lighting fixture 20 includes a main section 30 and an extension 40 which is telescopically extendible from the main section 30. FIG. 1 shows the lighting fixture 20 in an un-extended position, where the extension 40 is adjoining or adjacent to the main section 30. FIG. 2 shows the extension 40 now telescopically extended out from the main section 30, i.e., pulled out by hand, to allow the lighting fixture 20 to fit within a defined space in a room of a building. In FIGS. 1 and 2 the fixture is face-up for purpose of illustration. In the other Figures, the fixture 20 is shown face-down and the fixture is installed in the face-down orientation. The defined space DD (shown in FIG. 4) is a space generally between two fixed length lighting fixtures 52, or between one fixed length lighting fixture 52 and another fixed object, such as a wall, column, etc.

Figure 3:
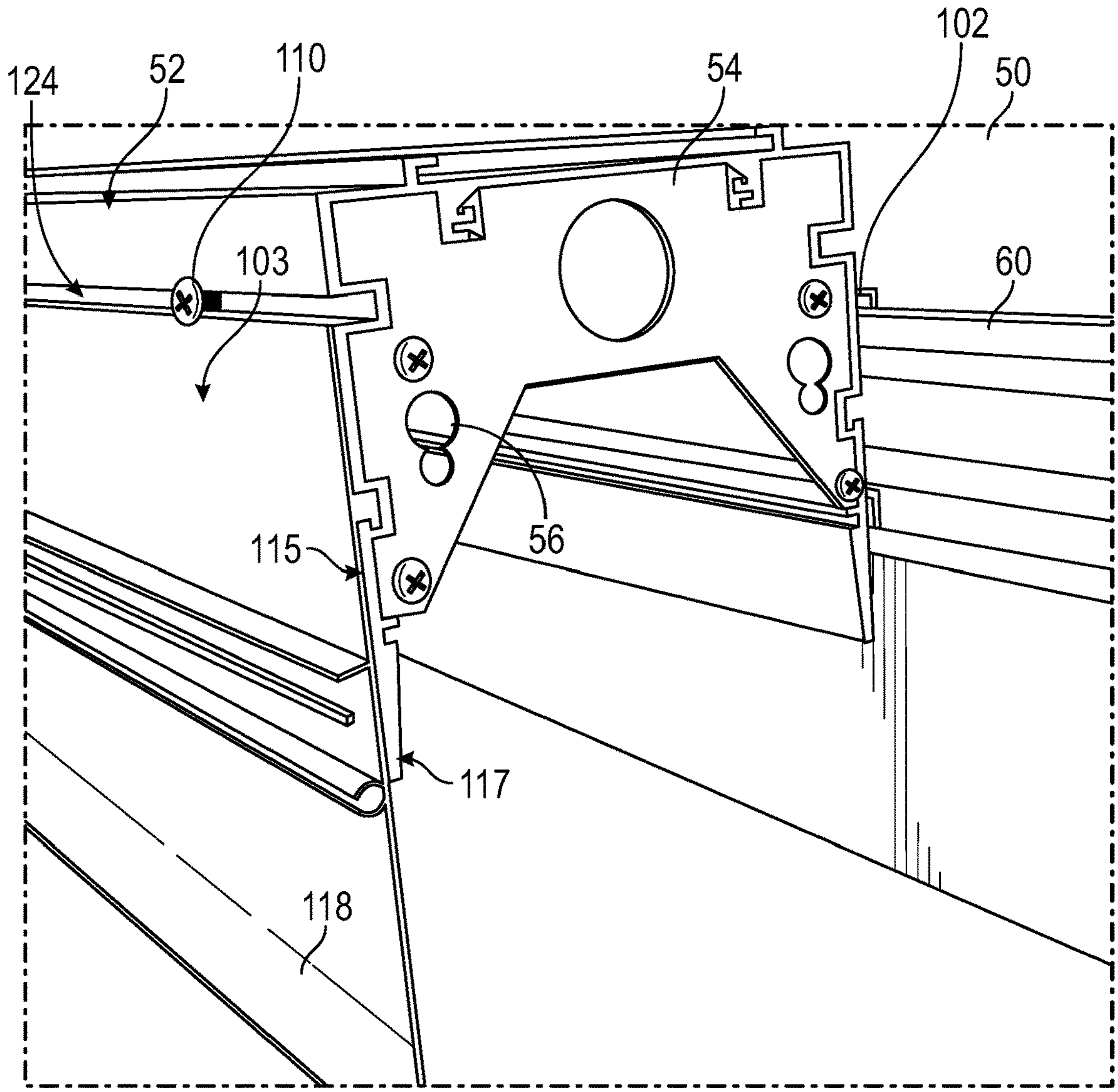
FIG. 3 is a perspective end view of an installed fixed-length lighting fixture.
Figure 4:
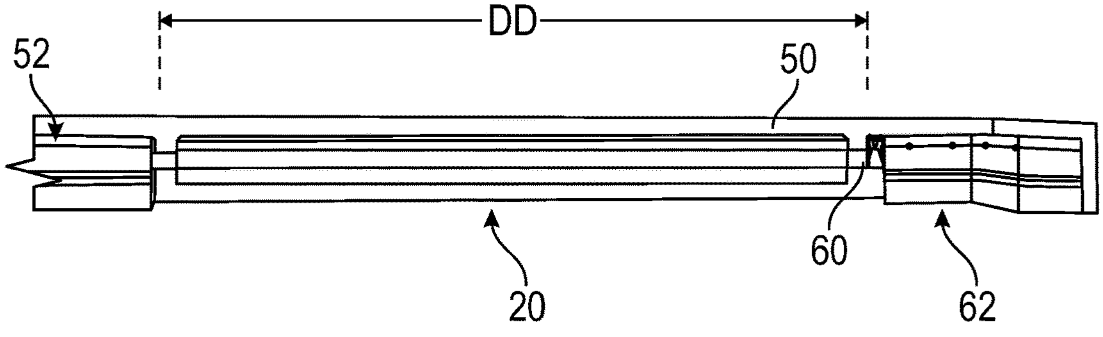
FIG. 4 is a side view of installation of the telescoping linear lighting fixture of FIG. 1 between the fixed length lighting fixture of FIG. 3 and a corner fixture.

FIG. 3 shows the first or left side of the defined space DD. As an example of a typical installation, a fixed length lighting fixture 52 is mounted on a wall rail 60 attached to a wall 50. The lighting fixture 52 has an end plate 54 including key slots 56. Adjacent fixtures are attached to each other via screws inserted through the key slots 56 as is well known in linear lighting technology. FIG. 4 shows a typical use of the telescopically extendible lighting fixture 20 between a fixed length lighting fixture 52 and a corner fixture 62. As the defined space DD between the fixed length lighting fixture 52 and the corner fixture 62 may have a somewhat random length within a given range, the telescopically extendible lighting fixture 20 is used to provide a lighting fixture having the desired length to fit in the defined space DD. Of course, the telescopically extendible lighting fixture 20 may be used in any defined space DD located between two fixed objects or positions. Generally, the precise length of the defined space DD is often unknown until after adjacent lighting fixtures or other objects are installed. Consequently, using a factory-made custom-length fixture, or providing multiple short lighting fixture segments, to complete the lighting installation within a reasonable amount of time, is often not practical or not possible. The present telescopically extendible lighting fixture 20 allows the installer to select the length needed for specific defined space DD, and to install the lighting fixture 20, with minimal measuring and field cutting (i.e., sawing components to length at the job site). FIG. 4 shows only a small area of the wall 50 around the fixture 20, for purpose of illustration, while the wall typically is room-height e.g. 7 to 10 feet (2.1 to 3 meters), or higher.

Figure 5:
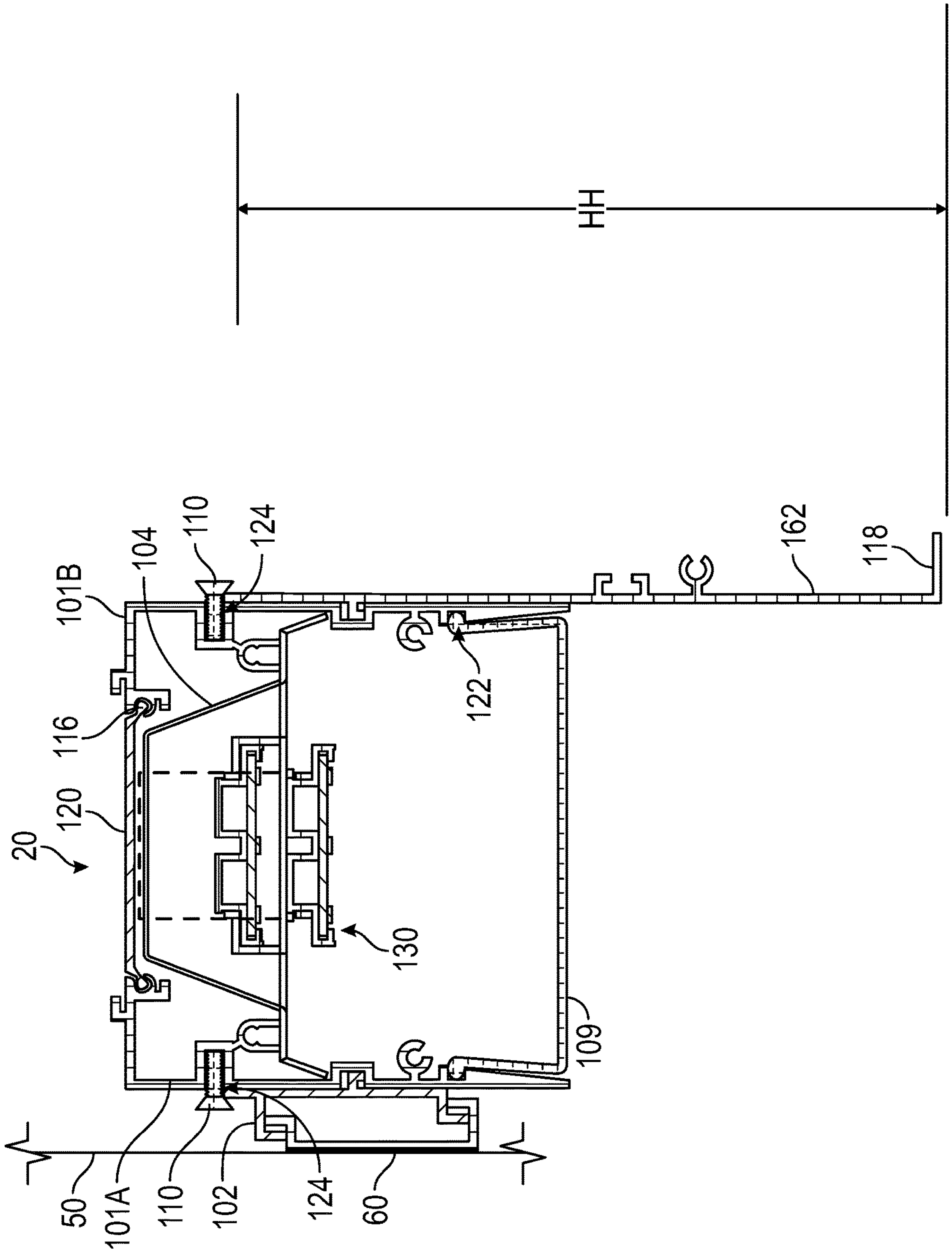
FIG. 5 is a section view of the main section of the telescoping linear lighting fixture of FIG. 1 having an alternative telescoping lighting assembly.
Figure 6:
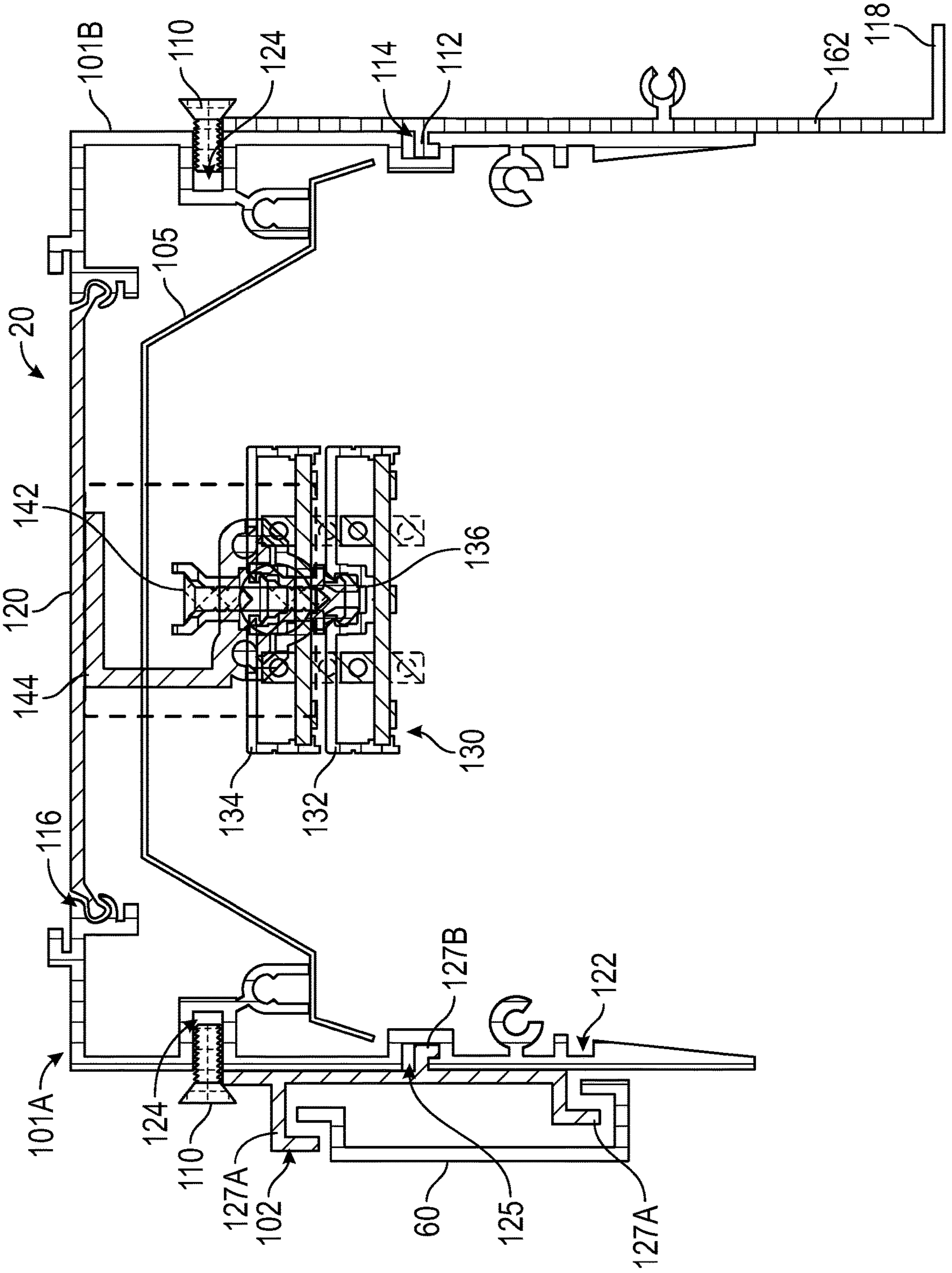
FIG. 6 is an enlarged section view of the lighting fixture of FIG. 5 showing additional details.

As shown in FIG. 5, the lighting fixture 20 may have a square, rectangular, or other geometric cross section shape. The main section 30 and the extension 40 have the same shape and cross section, as shown in FIG. 1. The main section 30 is longer than the extension 40. FIGS. 5 and 6 are section views of two similar embodiments taken along line 6-6 of FIG. 1. Thus, FIGS. 5 and 6 show elements of both the main section 30 and the extension 40. As shown, the lighting fixture 20 has a top 120 attached to a first side 101A and a second side 101B. A drop flange extension 162 is shown attached to the second side 101B. FIGS. 1 and 2 show the fixture 20 without the drop flange extension 162. FIG. 3 shows a drop flange 103 attached to an adjoining fixed-length fixture 52.

Figure 12:
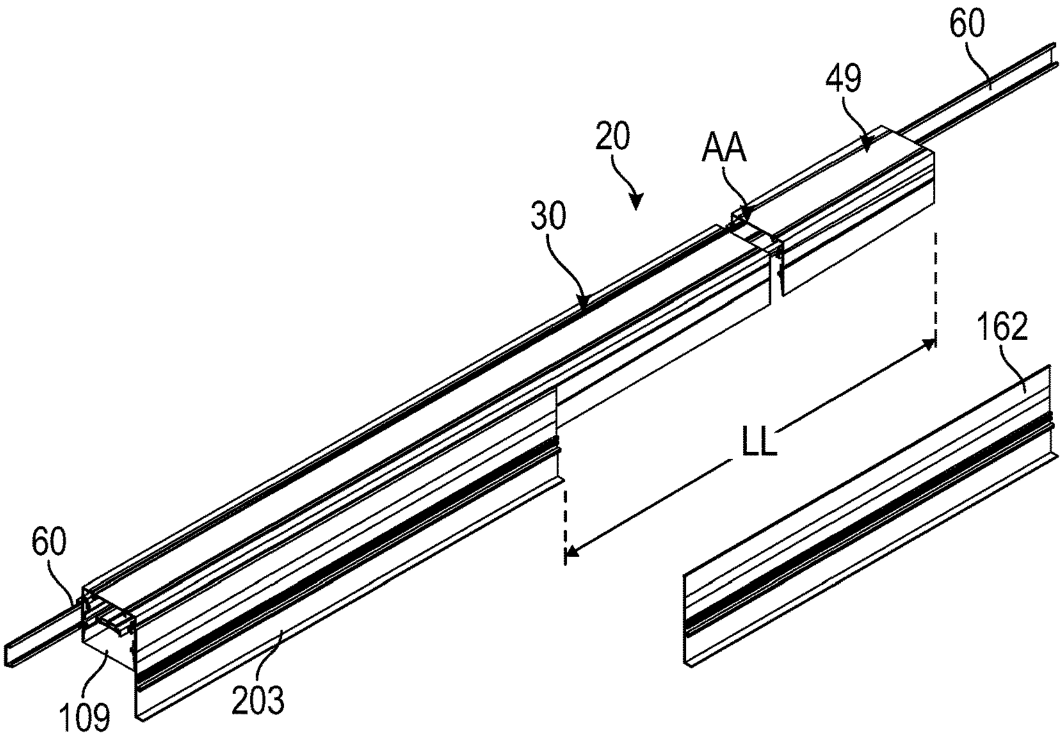
FIG. 12 is a perspective view of the lighting fixture of FIG. 1 in a partially extended position.

As shown in FIGS. 11-17, the fixture may be manufactured with a short drop flange 203 which is shorter than the main section 30, whereas the drop flange 103 is a full-length drop flange having a length equal to the full length of the fixture 52. Also as shown in FIG. 12, a drop flange extension 162 is provided with the fixture as a separate component, for attachment during installation. The drop flange 103, the drop flange extension 162 (and the unitary drop flange 182 described below, collectively referred to as drop flange elements) may have the same cross section, and may be made from the same extrusion, although they have different lengths. As shown in FIGS. 5 and 6, a horizontal lip 118 may extend perpendicularly outward at the lower end of each drop flange element, to support ceiling tiles. The drop flange extension 162 in FIG. 5 has a height HH greater than in the embodiment of FIG. 6. The height HH of the of the drop flange elements may vary depending on the installation specifications.

Figure 7A:
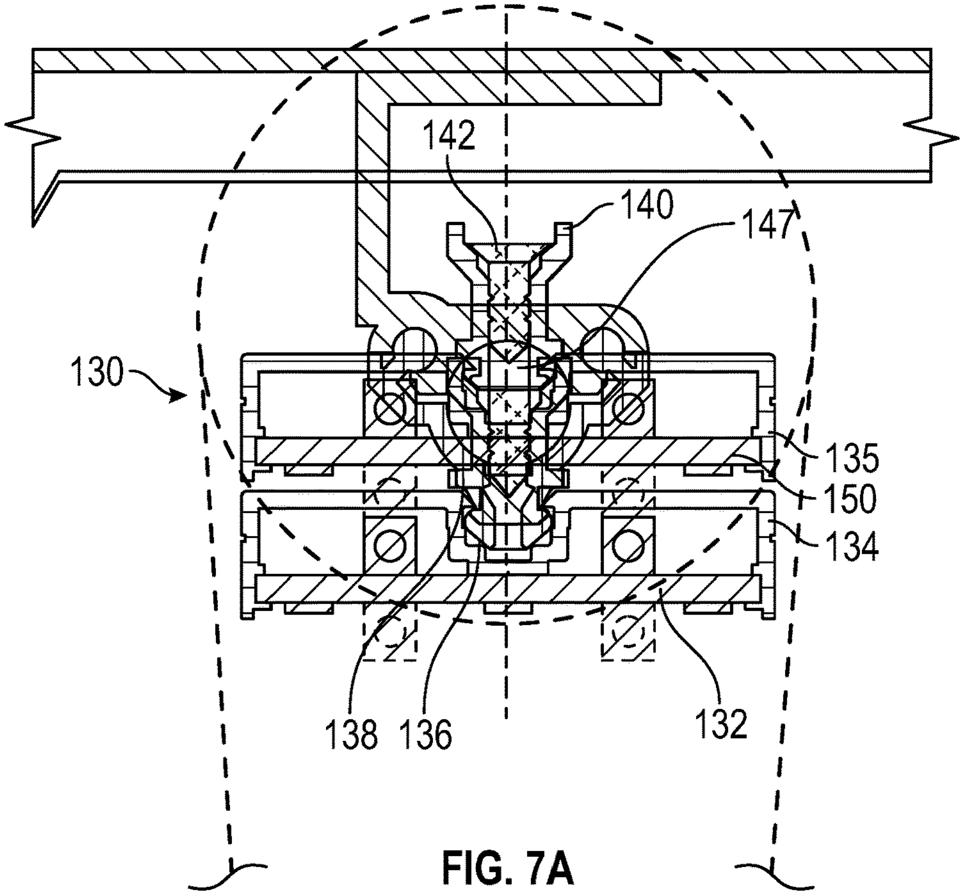
FIG. 7A is an enlarged section view of the lighting assembly shown in FIG. 6.
Figure 7B:
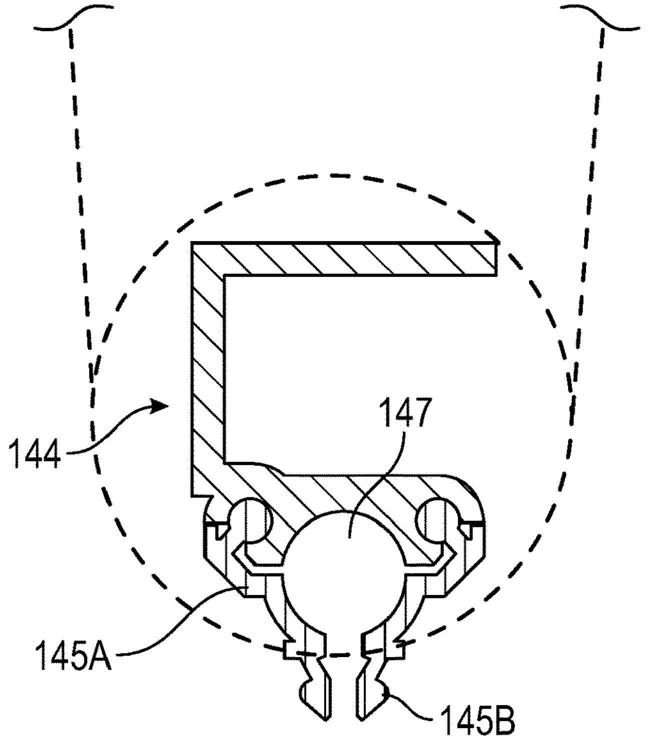
FIG. 7B is section view of the mounting base shown in FIG. 7A.
Figure 7C:
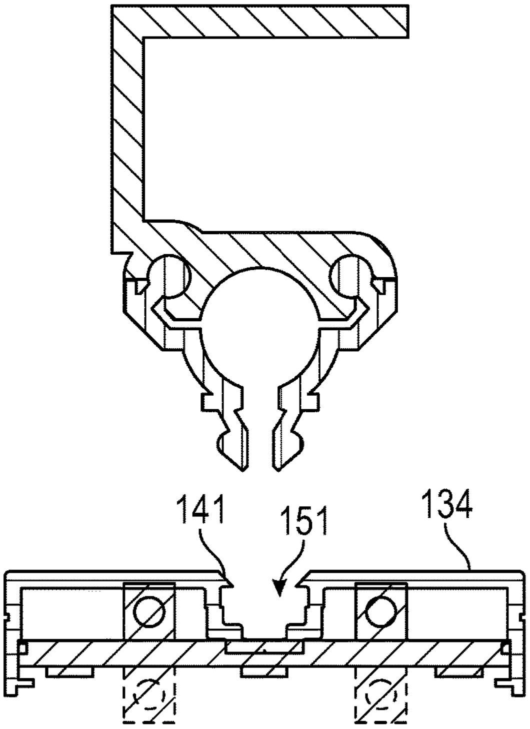
FIG. 7C is a section view of the engagement of the mounting base to the first board carrier shown in FIG. 7A, with the captive nuts removed from the first board carrier for purpose of illustration.
Figure 7D:
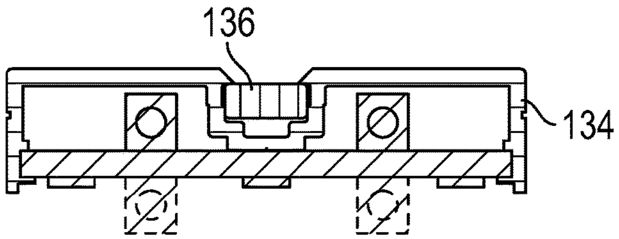
FIG. 7D is a section view of the first board carrier including the captive nuts shown in FIG. 7A.
Figure 7E:
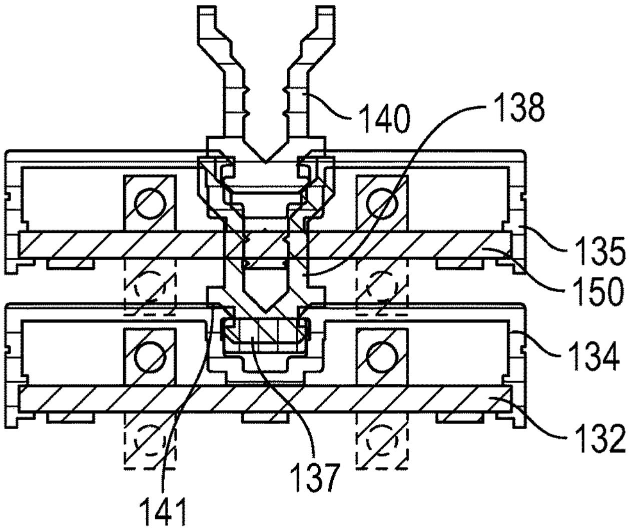
FIG. 7E is a section view of the lighting assembly of FIG. 7A without the mounting base.
Figure 7F:
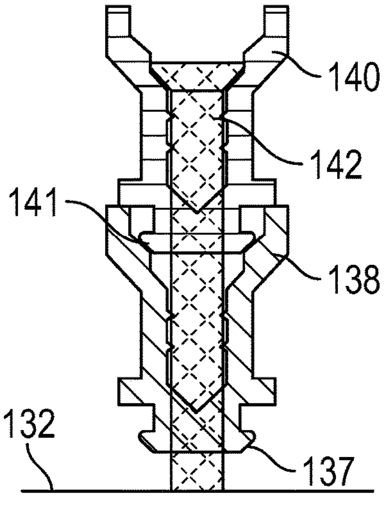
FIG. 7F is a section view of the spacer extrusion and the slider extrusion shown in FIG. 7E.

Referring to FIGS. 6-7F, a telescoping lighting assembly 130 is supported by one or more mounting bases 144 extending down from the top 120 of the fixture 20. A translucent or transparent lens or diffuser 109 is supported between lower ends of the first and second sides, as shown in FIG. 5. A wall rail 60 is provided with the lighting fixture 20 for attaching the lighting fixture to a wall 50. As shown in FIG. 3, the adjoining fixed length lighting fixture 52 is mounted on the wall rail 60. Both fixtures 20 and 52 may be attached to the wall 50 via the mounting rail 102 hooked onto the wall rail 60. The lighting fixture 20 may have studs, screws or other fasteners adapted to fit through the key slots 56 in the adjoining fixture 52. The lighting fixture 20 may have the same cross section shape as the adjoining fixture 52. In this case, the cross section of FIGS. 5 and 6 is also representative of the adjoining fixture 52. Multiple lighting fixtures may be hung on a single long wall rail 60, or each lighting fixture may be hung on its own separate wall rail, with the individual wall rails aligned with each other.

The top 120, the first side 101A, the second side 101B, the mounting rail 102, and the drop flange elements may be provided as aluminum extrusions. In this case, the extrusions may have features to facilitate assembly or attachment of the fixture components. For example, the sides 101A and 101B may have a top receiver slot 116 for holding the edges of the top 120. The first and second sides 101A and 101B may have an inward-facing slot or groove 122 for holding the lens 109. The first and second sides 101A and 101B may also have one or more outward-facing slot or groove 124. If used, self-tapping screws 110 may be driven into the slot 124 to securely attach the mounting rail 102 to the first or back side of the extension 40, and to securely attach a drop flange element 103, 162 or 182 to the second or front side 101B. Referring to FIG. 6, the screws 110 on the first side of the main section are only partially tightened at the factory, so that the mounting rail 102 can slide out telescopically from the main section 30. Since these screws on the first side are not accessible after the fixture 20 is hung on the wall rail 60, they remain only partially tightened.

Figure 18:
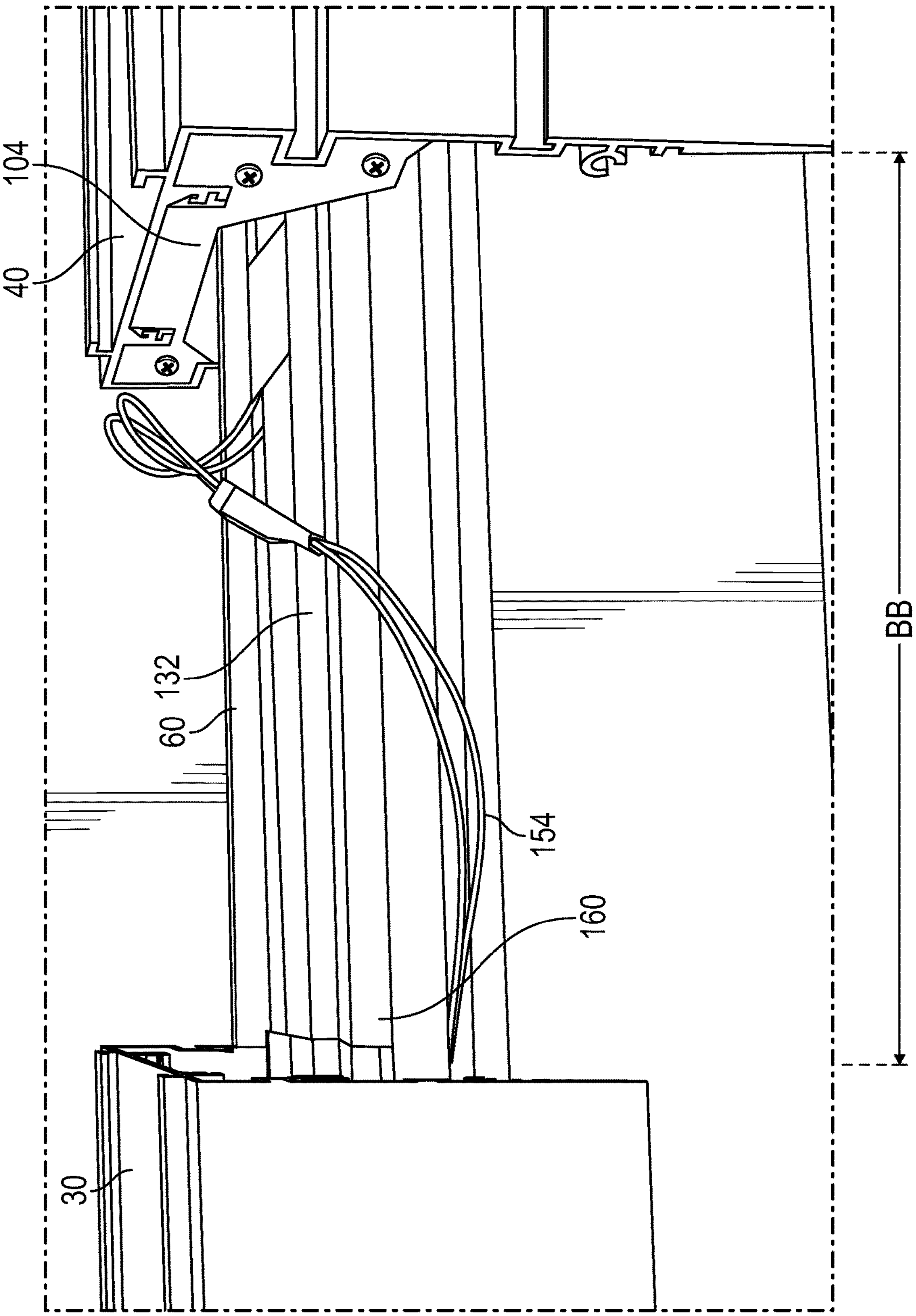
FIG. 18 is a perspective view of the lighting fixture of FIG. 1 installed, before attaching field cut components.
Figure 22:
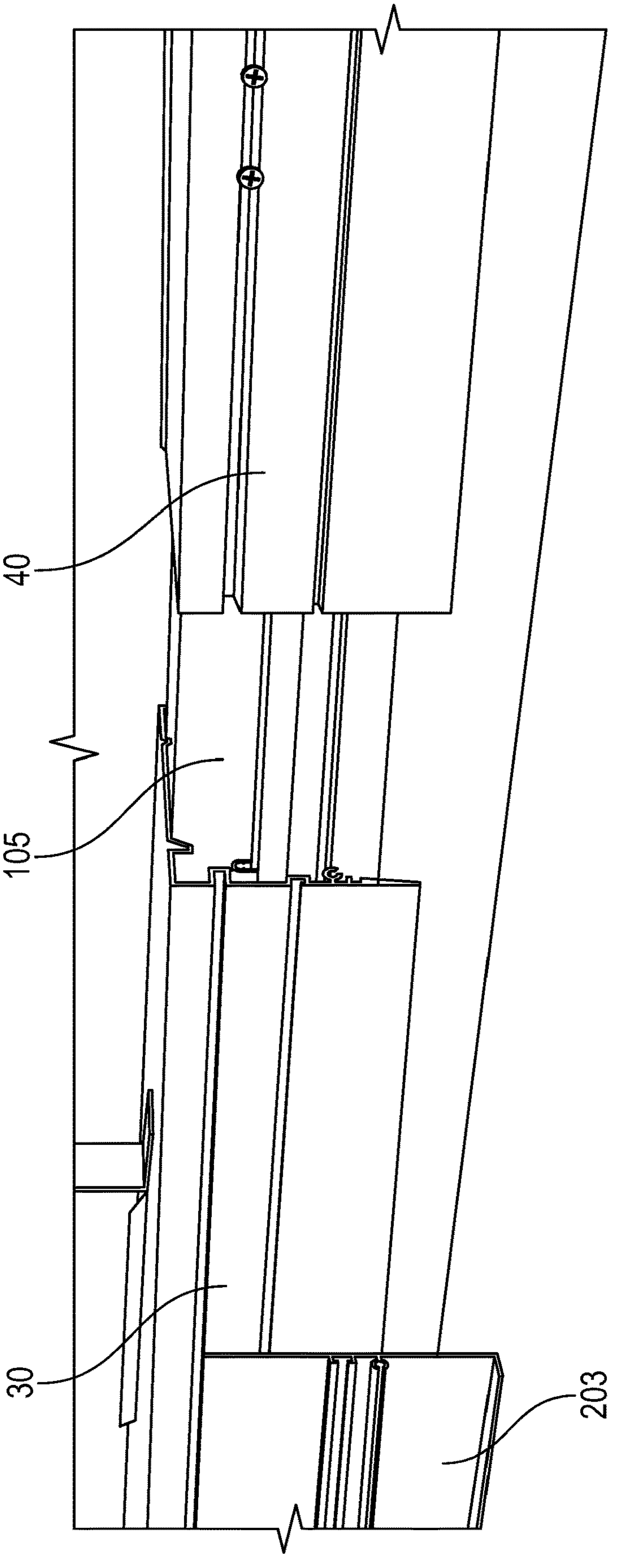
FIG. 22 is a perspective view of the completed installation of the fixture, with the drop flange extension cutaway for purpose of illustration.

The first and second sides 101A and 101B may optionally be symmetrical, so that the same extrusion may be used for the first and second sides. The extension 40 may have the same construction as the main section 30 as discussed above. FIG. 6 shows a cover 105 rigidly attached to the extension 40 and extending into the main section 30. The cover 105 may be formed or stamped sheet metal, e.g., steel. When the fixture 20 is extended, the cover 105 is positioned in the gap at the top of the fixture, to help keep dust and debris falling from falling into the fixture 20, as shown in FIGS. 18 and 22.

Turning to FIG. 7A, the telescoping lighting assembly 130 includes a first or fixed LED board 132 held in or by a first board carrier 134 which is rigidly attached to the main section 30 of the fixture 20. A second LED board 150 is held in or by a second board carrier 135. The first and second board carriers 134 and 135 may be aluminum extrusion channel sections, with the LED boards held between the arms of the channel section. The first and second LED boards 132 and 150 are commercially available dielectric material boards having multiple LEDs and associated wiring. The second board carrier 135 and the second LED board 150 have a length adapted to the length of the extension 40 plus the maximum travel of the extension 40 when it is pulled out or away from the main section 30. Typically the maximum travel is about 12-16 inches (30-40 cm). The first board carrier 135 and the first LED board 132 have a length adapted to the length of the fixture 20, or specifically to the length of the main section 30, which may range from 24 to 240 inches (60-610 cm or longer in special cases).

Figure 7G:
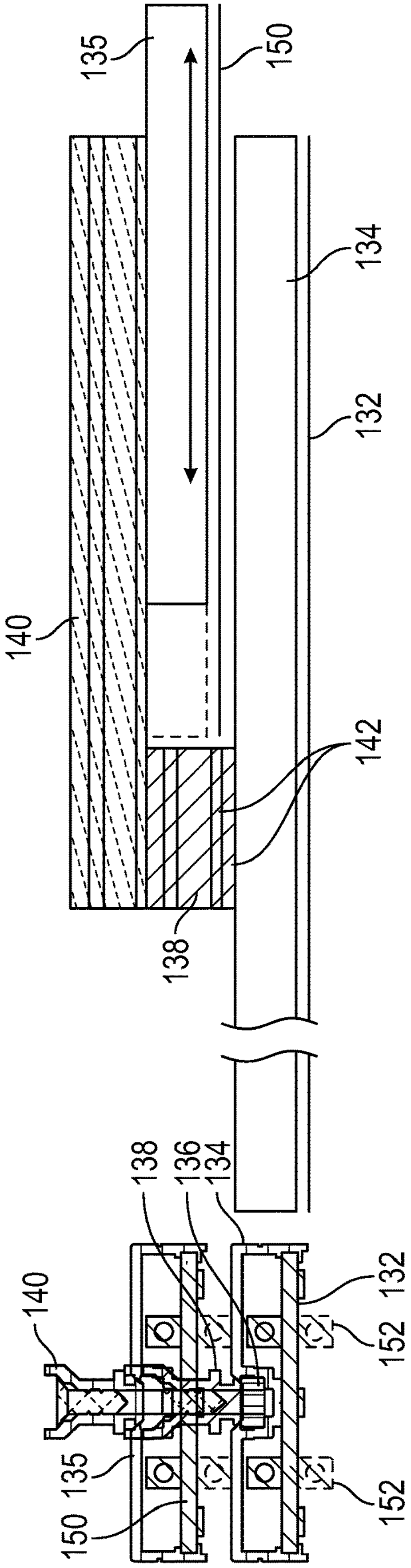
FIG. 7G is a schematic side view of the lighting assembly shown in FIGS. 7A-7F partially extended.
Figure 7H:
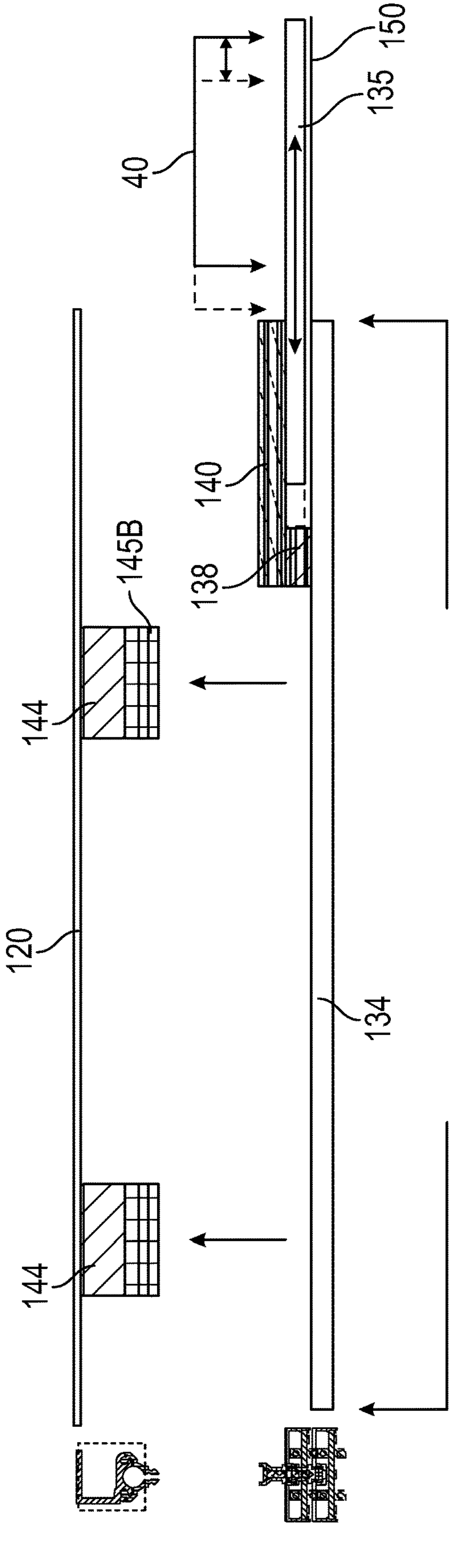
FIG. 7H is a schematic side view of the lighting assembly shown in FIG. 7 further showing attachment of the first board carrier to the top of the fixture, and the second board carrier extending into the extension.
Figure 8B:
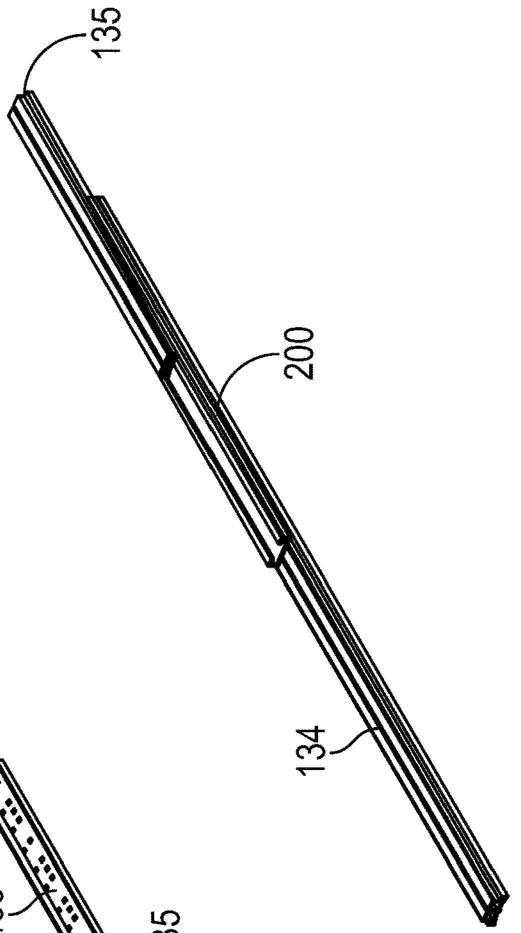
FIG. 8B is a top perspective view of the alternative telescoping lighting assembly of FIG. 8A.
Figure 8A:
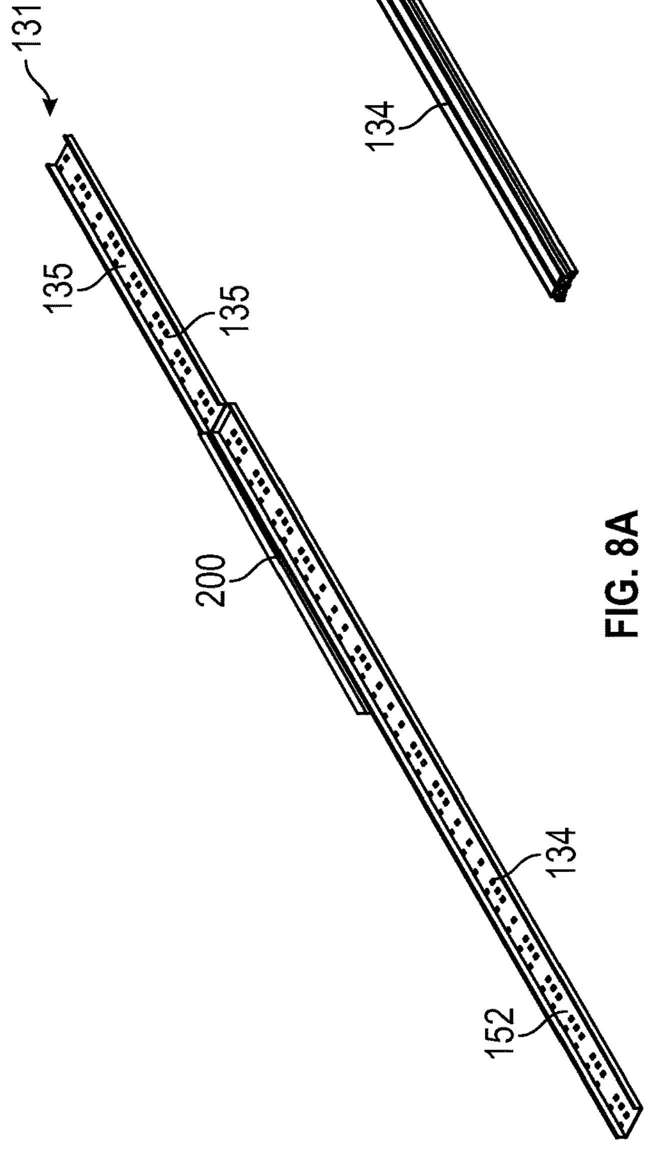
FIG. 8A is a bottom perspective view of an alternative telescoping lighting assembly.
Figure 8C:
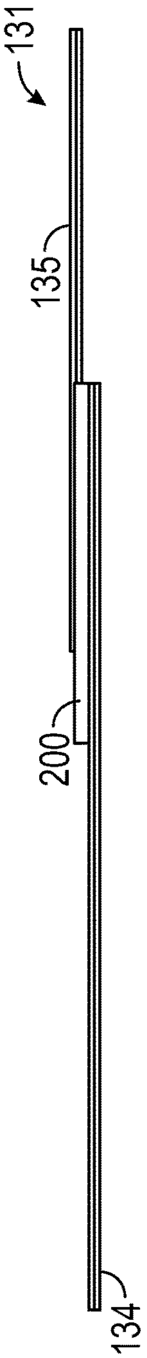
FIG. 8C is a side view of the alternative telescoping lighting assembly of FIG. 8A.
Figure 8D:
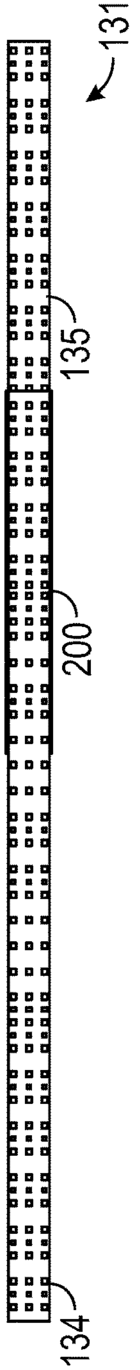
FIG. 8D is a bottom view of the alternative telescoping lighting assembly of FIG. 8A.
Figure 8E:
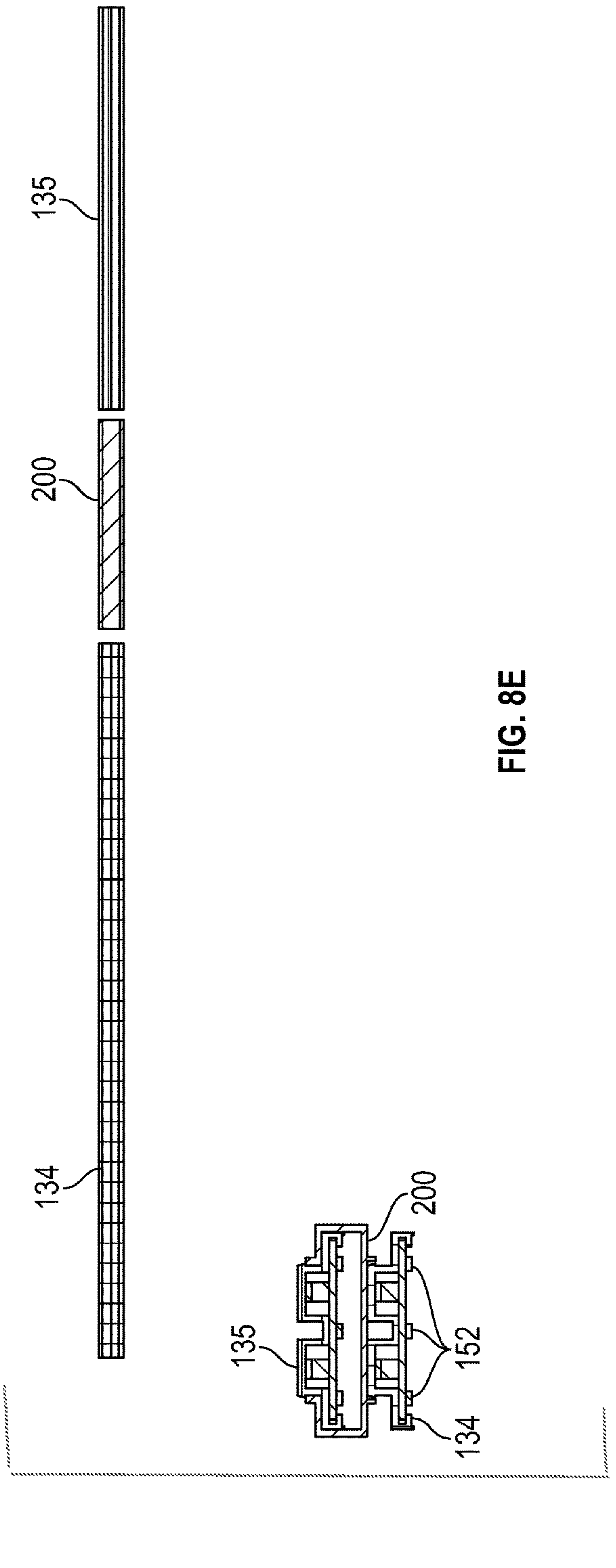
FIG. 8E is a schematic diagram of the alternative telescoping lighting assembly of FIG. 8A.
Figure 9:
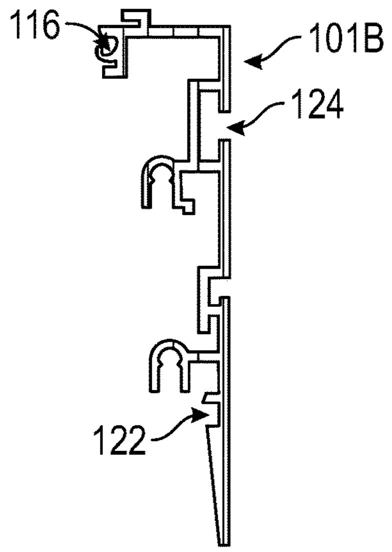
FIG. 9 is a section view of an extrusion which may be used as the first and second sides of the lighting fixture shown in FIG. 5 or 6.

The first LED board 132 is fixed onto the first board carrier 134. The first board carrier 134 is fixed into or onto the main section 30 via the assembly shown in FIG. 7A-7H. As shown in FIGS. 7E and 7F, the first board carrier 134 is rigidly attached to a spacer 138 by a shoulder or dovetail 137 in a spacer slot 151 in the top of the first board carrier 134. In the example shown, the spacer 138 is an extrusion. As shown in FIGS. 7F, 7G and 7H, the slider extrusion 140 is stacked on top of and rigidly attached to the spacer extrusion 138 by screws 142. As shown in FIGS. 7A and 7G, screws 142 extend through the slider extrusion 140, through the spacer extrusion 138, and engage captive nuts 136 in the spacer slot 151 in the first board carrier 134. The second board carrier is slidably supported on or in the slider extrusion 140 and can slide in and out, between the first board carrier 134 and the slider extrusion 140.

Thus, as shown in FIGS. 7G and 7H the second board carrier 135 is slidable and all of the other components are rigidly fixed or attached, directly or indirectly, to the main section 30. The spacer extrusion 138 and the slider extrusion 140 may be made of the same extrusion. With the second board carrier 135 in the fully retracted position shown in dotted lines in FIGS. 7G and 7H, the second board carriers 135 projects fully into the extension 40. As a result, as shown in FIG. 1, the first and second board carriers 134 and 135 and the first and second LED boards 132 and 150 extend over substantially the entire interior length of the un-extended fixture 20.

Referring to FIGS. 7A, 7C and 7H, the mounting bases 144 are attached to the top 120. First and second retainer arms 145A and 145B are pivotally attached to the lower end of the mounting base 144, and are biased apart by resilient rod 147 made of rubber, foam rubber, or other resilient material. The retainer arms are pushed into the spacer slot 151 with a snap-action to attach the first board carrier to the mounting base 144. The spacer extrusion 138, the first board carrier 135 and the first LED board 132 are consequently fixed in place in the main section 30. A similar design may be used to attach the second board carrier to the extension 40.

The mounting base 144 may be provided as multiple separate spaced apart mounting base elements, or as a single elongated mounting base extending substantially the entire length of the main section 30. The mounting base 144, the first and second board carriers 134 and 135, the spacer extrusion, the slider extrusion, and the retainer arms, may be provided as aluminum extrusions.

The lighting assembly 130 is assembled and installed into the fixture 20 at the factory. During field installation, the installer need not touch, adjust, or otherwise interact with the lighting assembly 130, other than making electrical connections with wire leads extending from the first LED board.

Also as shown in FIGS. 7A and 7F, the board carriers 134 and 135 are C-shaped channel sections which engage and hold the LED boards along their edges. A set screw threaded through the channel section may be tightened to secure the LED board in the board carrier. In this embodiment, the board carriers are adapted to hold an LED board of one specific width. In an alternative design, especially useful for narrow (1-2 inch (2.5-5 cm)) wide LED boards, the spacer extrusion and the slider extrusion are attached to the LED boards on their centerlines, as shown via the dotted line in FIG. 7A.

Referring back to FIGS. 1 and 2, the extension 40 is rigidly attached to the mounting rail 102, which is slidably attached to the main section 30. As used in this specification, attached rigidly attached means only attached (directly or indirectly) in a way that prevents sliding, and attached means attached (directly or indirectly) in a way that may or may not prevent sliding or other movement. Of course, this configuration may be reversed with the mounting rail 102 slidably attached to the extension and rigidly attached to the main section 30. FOR A SHORT EXTENSION, IT COULD COME OFF RAIL. Pulling the extension 40 out also pulls the second board carrier 135 carrying the second LED board 150 slides out from the slider extrusion 140, as shown in FIG. 7G, as the distal (right side in FIG. 7G) end of the second board carrier 135 is rigidly attached to the extension 40.

A wire loop 154 in the main section 30 is electrically connected to the first and second LED boards with sufficient slack to maintain continuous electrical connection, regardless of the position of the extension 40. The pattern of LEDs 152 is the same on the first and second LED boards 132 and 150. Thus, the lighting provided by the extension 40 is largely the same as the lighting provided from the main section 30. The fixture 20 is therefore capable of providing substantially uniform lighting across the entire defined space DD. The LEDs may be wired in parallel for this purpose.

FIGS. 8A-8E show an alternative telescoping lighting assembly 131 which may be used in the lighting fixture 20 as shown in FIG. 5. In this design, a middle extrusion 200 is rigidly attached to the first board carrier 134. The second board carrier 135 slides into and out of the middle extrusion 200, allowing the second board carrier 125 to slide in over the first board carrier 134. In the example shown, the sliding second board carrier 135 carries a 24 inch (61 cm) long LED board and the fixed first board carrier carries a 48 inch (122 cm) long LED board. The first board carrier 134 is rigidly attached to, and resides entirely in, the main section 30. The second board carrier 135 is (indirectly) rigidly attached to the extension 40, with 12 inches (30.5 cm) of the second carrier board residing in the extension 40 and 12 inches (30.5 cm) residing above the first board carrier in the main section 30.

Figures 15, 16, 17:
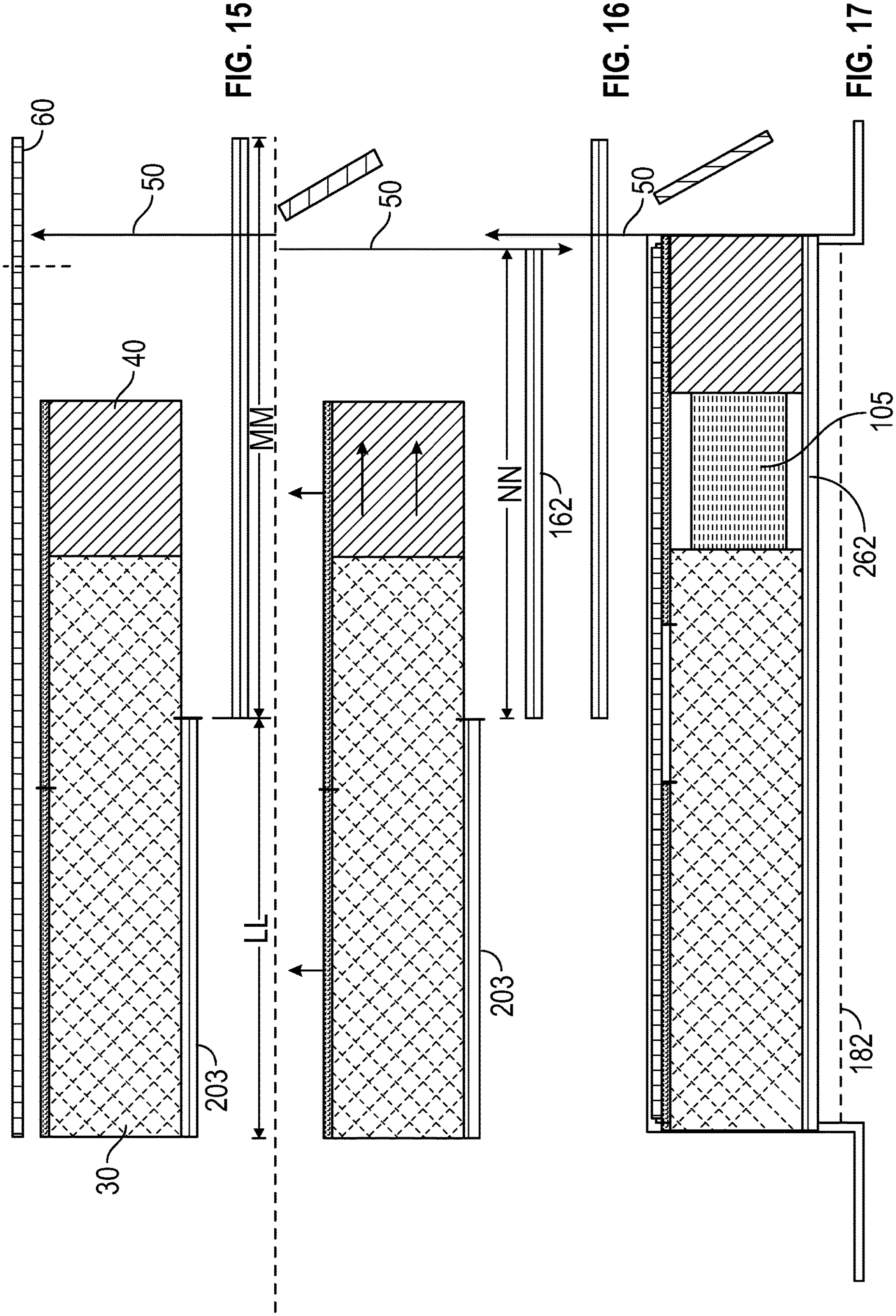
FIG. 15 is a schematic diagram of the lighting fixture of FIG. 1 in the un-extended position.
FIG. 16 is a schematic diagram showing an intermediate installation step.
FIG. 17 is a schematic diagram of the installed lighting fixture in the extended position.

In a method of use, the fixture 20 is installed in a defined space, such as space DD in FIG. 4. This may be achieved by first installing a wall rail 60 onto a wall 50 using conventional techniques (screws, wall anchors, adhesives, etc.), with the wall rail extending across the defined space DD. In some installations, the wall rail may already be installed in the defined space while installing fixed length lighting fixtures 52. The fixture 20 is packaged and shipped with a wall rail 60, which, if used, may be field cut to fit into the defined space, as shown in FIG. 17. The field cut length of the wall rail 60 need not be precise (it may be several centimeters shorter than the length of the defined space) because after the fixture 20 is installed, the wall rail 60 is not visible. The term field cut means cutting performed by the installer at the installation site. The term adapted to be field cut means an overlength element provided to be field cut to a desired length to fit into the lighting fixture 20 after it is extended.

After the wall rail 60 is installed or is otherwise in place in the defined space, the fixture 20 is placed onto the wall rail 60, with the fixture 20 in the un-extended position as shown in FIG. 1. The mounting rail 102 may be engaged or hooked onto or into the wall rail 60, for example as shown in FIGS. 5 and 6. This engagement supports the fixture 20 vertically and also holds the fixture 20 up against the wall 50. FIG. 3 shows an adjacent fixed length lighting fixture 52 supported on the wall rail 60 in the same way. In an alternative design, the wall rail 60 may be omitted and the mounting rail 102 attached to the wall using other techniques.

The fixture 20 is telescopically extended sufficiently to fill in the defined space. This is performed by pulling the extension 40 out of the main section 30, as shown in FIG. 2. The extension 40 may be pulled out until it contacts the wall, object or other fixture defining the defined space. Thus, in FIG. 4 the extension may be pulled out until it contacts the corner fixture 62. A stop 64 shown in FIG. 2 may be provided on the mounting rail 102 to prevent the extension 40 from separating from the main section 30.

The second or sliding board carrier 134 carrying the second or sliding LED board 146 is rigidly attached to the extension 40 and slides out with the extension 40, as shown in FIG. 2. The wire loop 154 unfolds to maintain the electrical connection between the fixed first LED board 132 and the second or sliding LED board 146, which are both powered by a power supply or power cable electrically connected to the fixed LED board 132.

The extension 40 is rigidly attached to the mounting rail 102. The mounting rail 102 is slidably attached to or engaged into a mounting rail slot 125 in the first side 101A. As the extension 40 is pulled out, an inward arm 127B on the mounting rail 102 slides along the mounting rail slot 125, while outward arms 127A (shown in FIG. 6) slide along the wall rail 60. This generally holds the extension 40 in alignment with the main section 40. As best shown in FIG. 6, the arms 127A and 127B engage the wall rail 60 with an amount of clearance, e.g., about 0.2 to 0.5 inches (0.5 to 1.3 cm). This allows the fixture 20 to shift slightly towards and away from the wall, to compensate irregularities in the wall 50.

The sliding board carrier 134 itself need not be locked against further telescoping movement. This avoids any need for the installer to access or contact the lighting assembly 130 during the installation. Thus, in the example shown, the fixed LED board 132 and the sliding LED board 146 may remain telescopically slidable relative to each other, even after the overall length of the fixture 20 is fixed via the screws 110.

As also shown in FIG. 2, with the fixture 20 in the extended position, the pattern of LEDs on the fixed LED board 132 is largely replicated in the extension 40 via the extended position of sliding LED board 146 to better provide uniform lighting in the defined space, regardless of the position of the extension 40.

FIG. 1 shows the initial un-extended position of the fixture 20, without any drop flange element. FIG. 12 shows the fixture 20 in a slightly extended position, with the main section 30 and the extension 40 separated by a small gap of about 2 inches (5 cm). The fixture 20 may be shipped in this position. This better avoids the need for field cutting components to fractions of an inch, which is more difficult than field cutting longer lengths. For example, a nominally 72 inch (183 cm) long fixture is shipped with a 2 inch (5 cm) gap between a 12 inch (30.5 cm) long extension and a 58 inch (147 cm) long main section, so that the field cut components, if used, are at least two inches (5 cm) long.

Figure 13:
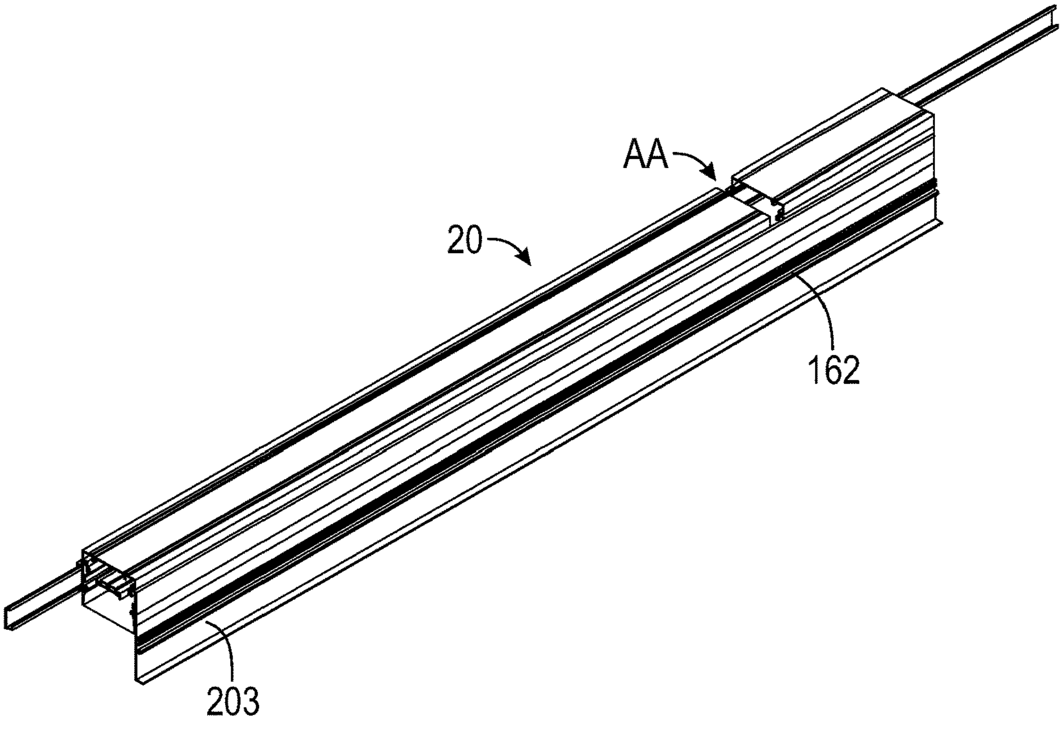
FIG. 13 is a perspective view of an alternative embodiment lighting fixture having a unitary drop flange.
Figure 14:
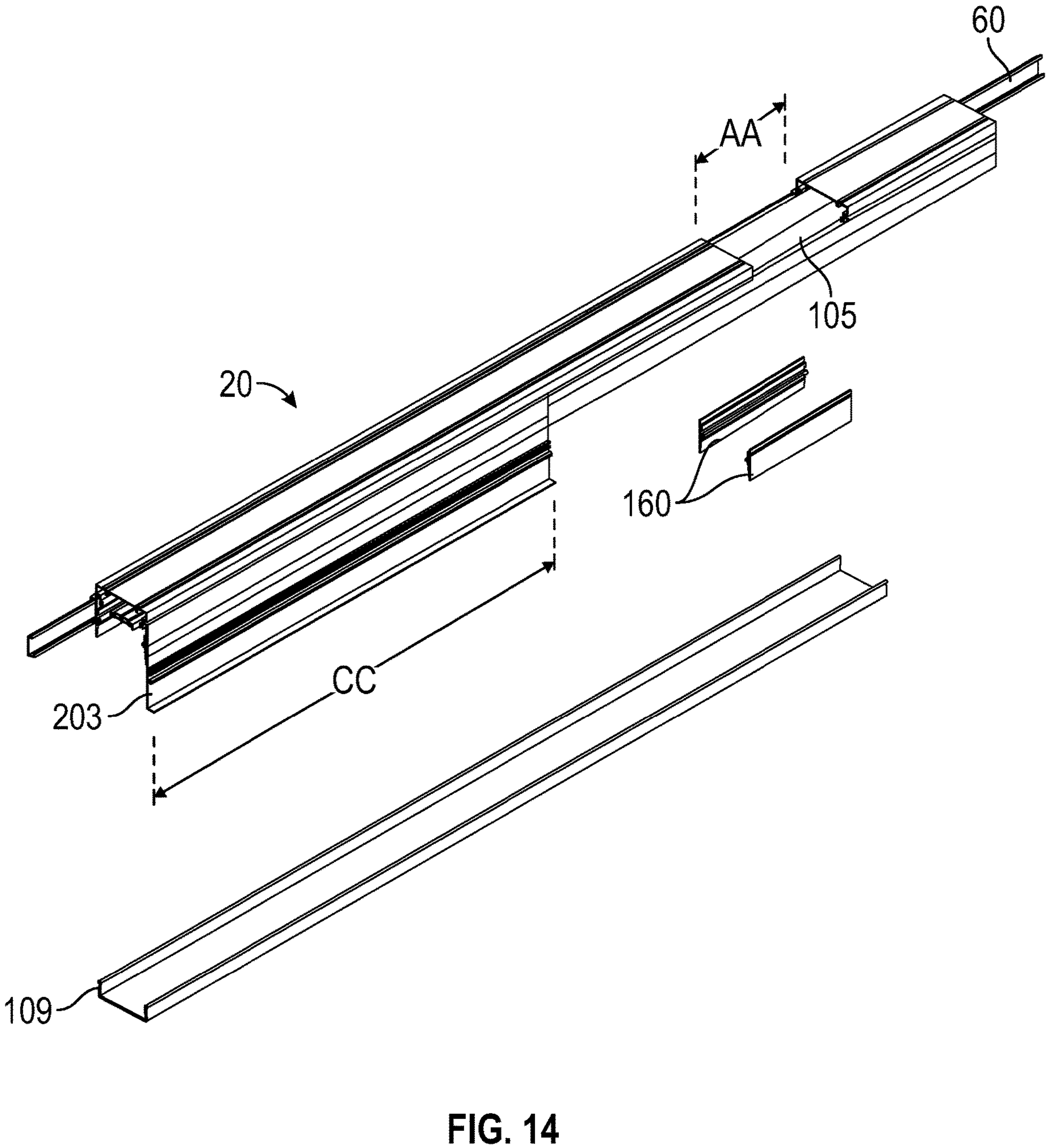
FIG. 14 is a perspective view of the lighting fixture of FIG. 1 in an extended position and illustrating field cut components.
Figure 19:
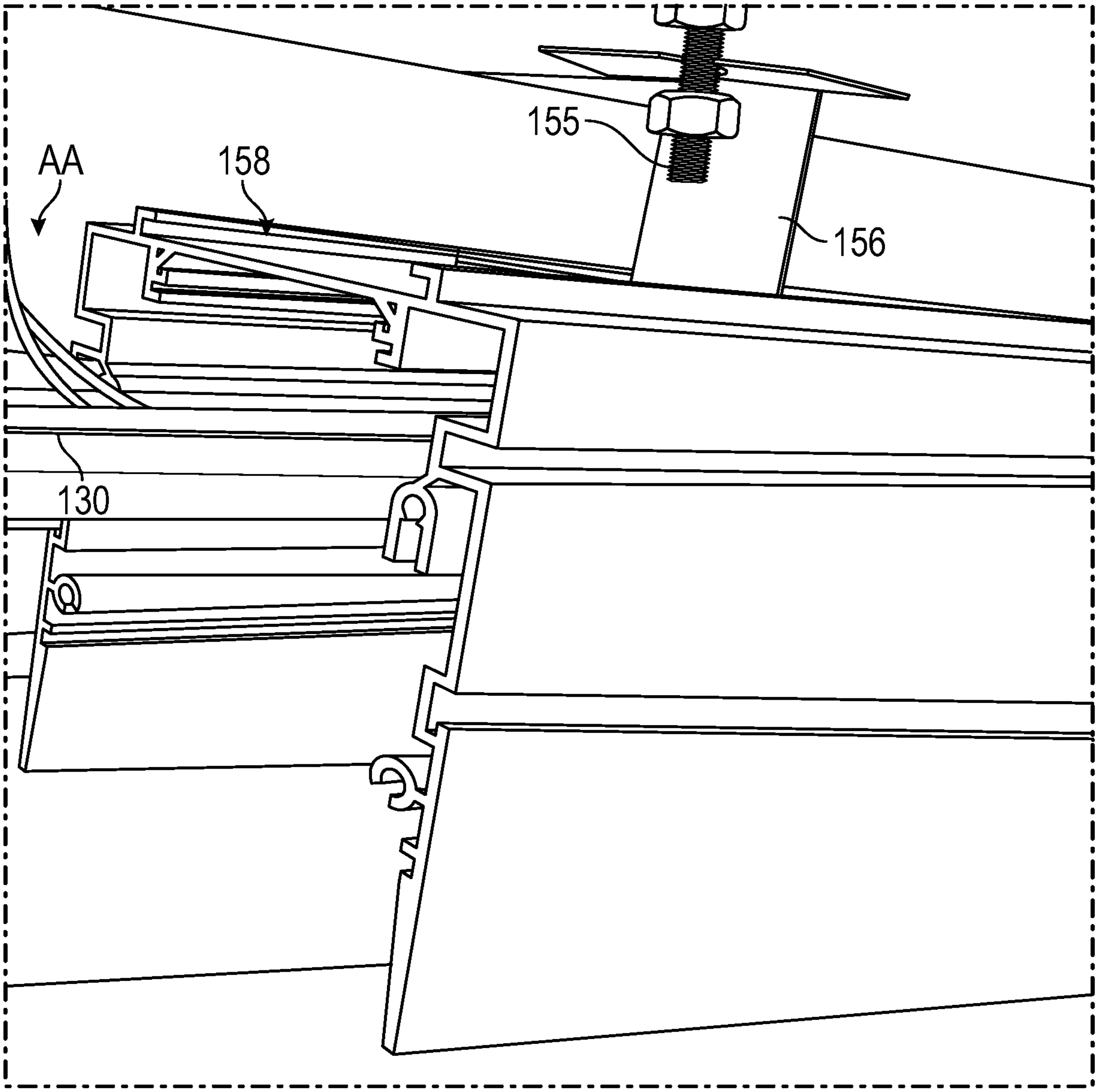
FIG. 19 is a perspective end view of the lighting fixture as it is shown in FIG. 18.

FIGS. 13 and 14 show the fixture 20 now in a final extended position. The range of telescoping travel of the extension 40 may be selected depending on expected range of the length of the defined spaces where the fixture 20 will be used. In most cases, a telescoping travel range of up to 12 or 16 inches (30.5 to 41 cm) is sufficient. The wall rail 60, if provided with the fixture 20, has a length equal to the maximum extended length of the fixture 20. As shown in FIG. 19, the extension 40 and/or the main section 30 may also be supported using ceiling hangers (e.g., threaded rod 155) attached to a sliding hanger bracket 156, which is slidable in a top groove 158 on the extension 40, the main section 30, and/or the fixed length fixtures 52.

As shown in FIGS. 12, 13 and 14, as the extension 40 is pulled away from the main section 30, the mounting rail 102 (which is rigidly attached to the extension 40) slides out of the main section 30, specifically, out of the first side 101A of the main section. A gap AA is left between the top of the extension 40 and the top of the main section 30. As a result, the cover 105 is visible through the gap AA. However, the gap AA ordinarily is not visible after the fixture 20 is installed, because the fixture 20 is partially or entirely above the ceiling of the room. In addition, gap AA is above the down-facing LED's so that it does not affect lighting provided by the fixture 20.

With the extension 40 pulled away from the main section 30 to extend the length of the fixture 20, another gap BB is created on the second or front side of the fixture. As the gap BB is potentially visible, it is covered by a drop flange element, as described below.

The gap BB may also cause a gap in support for the lens. As shown in FIG. 5, the lens 109 may be held in place with the edges of the lens in the slots 122. In the gap BB there are no slots to support the lens 109 because the sides 101A and 101B of the fixture 20 are absent in the gap. To better support the lens 109 and provide uniform lighting through the gap BB, lens flanges 160A and 160B may be installed into the gap BB.

Figure 10:
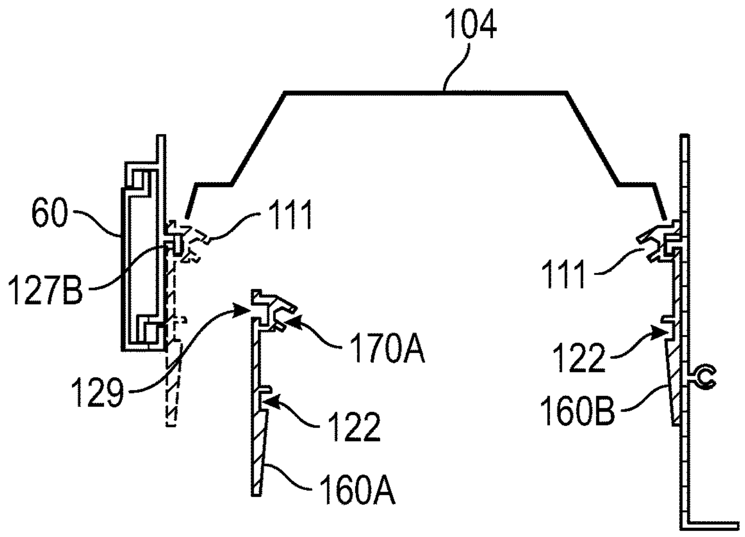
FIG. 10 is a schematic diagram showing installation of lens aperture flanges.
Figure 11:
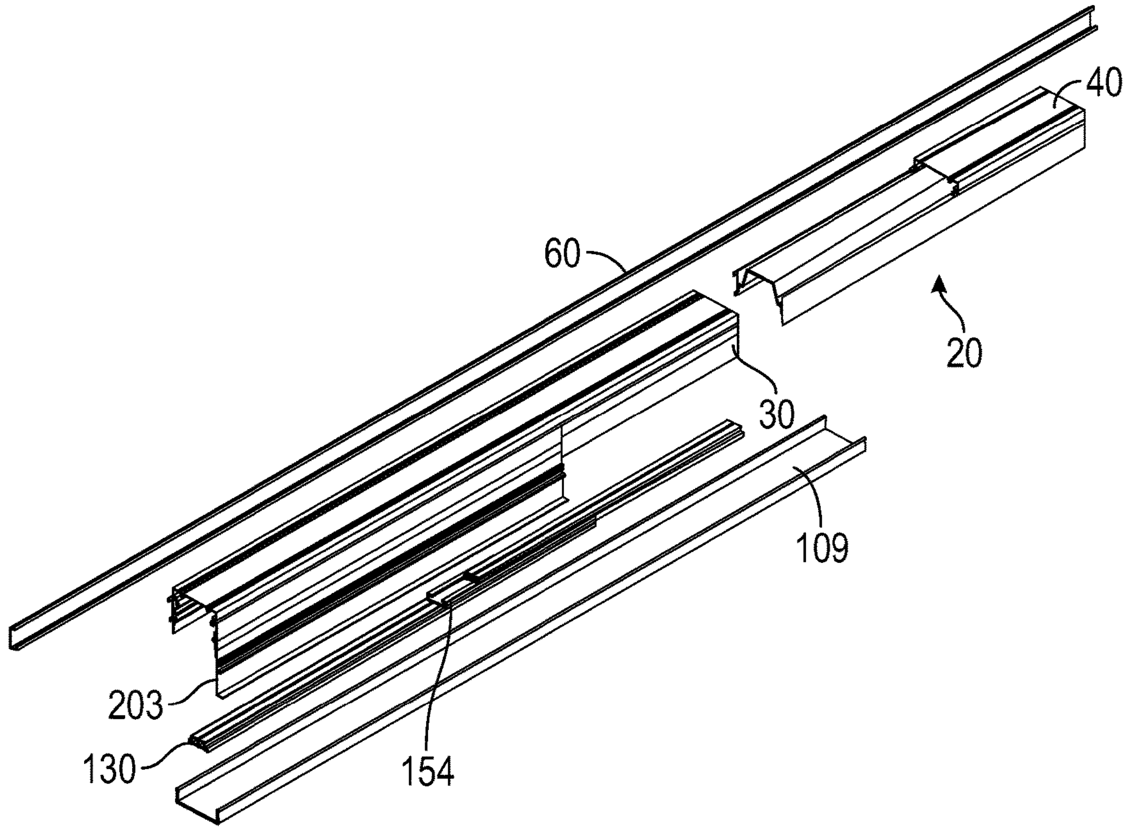
FIG. 11 is an exploded perspective view the lighting fixture shown in FIG. 1.

As shown in FIG. 10, first and second lens flanges 160A and 160B may be identical to each other with both made from the same extrusion. The first lens flange 160A is attached to the portion of the mounting rail 102 extending through the gap BB. The second lens flange 160B is attached to the inside of drop flange element, after the drop flange element is installed. The first and second lens flanges 160A and 160B may be field cut to the match the length of the gap BB. Field cutting the lens flanges 160A and 160B, if used, need only be done with a moderate degree of precision (e.g., +/−0.12 or 0.06 inches) (0.3 cm to 0.15 cm), because an exact fit into the gap BB is not essential. As shown in FIG. 14, the lighting fixture 20 is provided with lens flange extrusions 160 adapted for field cutting, i.e., pieces longer than the maximum gap BB achievable by the lighting fixture. The lens flange extrusions 150 also have set screws in threaded holes, spaced apart longitudinally by 1-2½ inches (2.5 to 6.2 cm), so that regardless of their field cut length, each lens flange will have at least one set screw for attaching it to the fixture 20.

Alternatively, since the fit of the lens flanges into the gap BB is not critical, the fixture 20 may optionally be provided with multiple lens flanges of varying length. In this case, the installer selects and installs lens flanges having the best fit into the gap BB. This avoids the need to field cut the lens flanges. In other designs, no lens flanges are used and needed and the lens simply bridges the gap BB without support.

Figure 20:
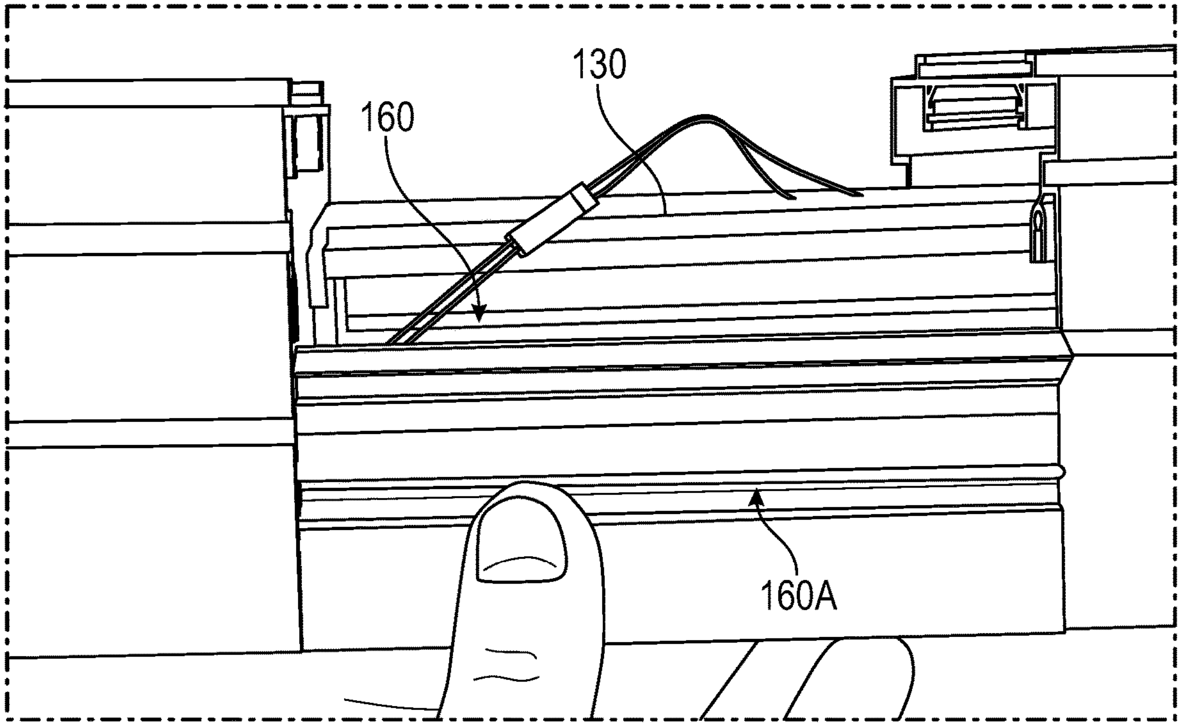
FIG. 20 is a perspective view showing attachment of a lens aperture flange.
Figure 21:
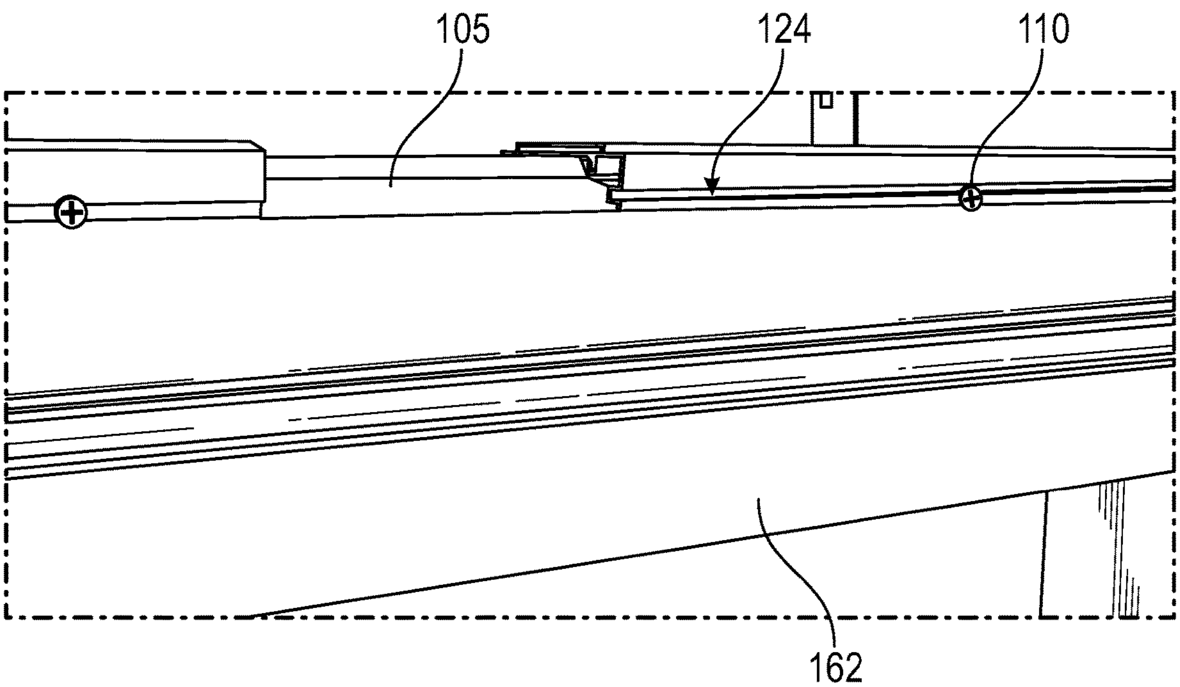
FIG. 21 is a perspective view of the lighting fixture as shown in FIGS. 18 and 19, with the drop flange extension now attached.

Referring still to FIG. 10, the lens flange 160A has an arm slot 129 which is positioned over the inward arm 127B of the mounting rail 102 (which is exposed in the gap BB). The lens flange 160A may be secured in place using a set screw 111 driven through a threaded hole in the arm slot 170A and into contact with the inward arm 127B. FIG. 20 shows the lens flange 160A being moved into the fixture for installation. The lens flange 160B may be installed onto the inside surface of the drop flange element in the same way. When the lens 109 is installed, as discussed below, the edges of the lens 109 are supported in slots 122 in the lens flanges 160A and 160B, in the same way they are supported in the slots 122 in the sides 101A and 101B of the main section 30 of the fixture 20.

In an alternative method, multiple lens flange segments of varying lengths are provided. The installer then selects lens flanges of the closest appropriate length and installs them as described above, without any field cutting of the lens flanges. For example, the fixture 20 may be provided with a kit of lens flange segments from e.g., one to 12 or 16 inches (30.5 to 40.6 cm), in one or one half inch (2.5 or 1.2 cm) increments.

The next step is installing the drop flange element which closes the gap BB on the front or second side of the fixture 20. Referring momentarily to FIG. 3, in a fixed length fixture 52, a drop flange 103 is attached to the second or outer side 115 of the fixture 52 and extends down substantially below the lower end 117 of the second side 115. A horizontal lip 118 at the lower end of the drop flange 103 may be used as a support for ceiling tiles or material.

Referring to FIGS. 12-14, in one embodiment the fixture 20 is provided with a short drop flange 203 rigidly attached to the second side 101B of the main section 30, and there is no drop flange element on the extension. As shown in FIG. 15, the short drop flange 203 has a length LL which extends only about 50 to 70% of the length of the main section 30 of the fixture 20. The short drop flange 203 may be attached to the main section 30 using the attachment design shown in FIG. 3. A drop flange extension 162 is provided with the fixture 20, as a separate piece not attached to the fixture 20. The drop flange extension 162 has an original length MM e.g., 10% longer than the maximum extended length of the fixture 20, minus LL, as shown in FIG. 15. The drop flange extension 162 may be made of the same extrusion as the drop flange 103 shown in FIG. 3.

After the extension 40 is pulled out to the desired extended position to fill in the defined space DD, the desired length of the drop flange extension 162 is determined (and is equal to the length of the now extended fixture 20, less the length CC of the short drop flange 203 shown in FIG. 14). The drop flange extension 162 is then field cut to a length NN to match the extended length of the fixture, minus LL, as shown in FIGS. 16 and 17. The field cut drop flange extension 162 may then be attached to the second or outer sides of the main section 30 and the extension 40, in the same way as shown in FIG. 3. Thus, when installed, the drop flange 162 overlies a large fraction (e.g., 10-50%) of the length of the main section 30, covers the gap BB, and overlies the entire length of the extension 40. With the drop flange 162 installed, the horizontal lip 118, shown in FIGS. 5 and 6, extends along the entire length of the now extended fixture, to better support ceiling tiles. When installed, the drop flange extension 162 also strengthens and stiffens the fixture 20, and helps to keep the main section 30 and the extension 40 aligned with each other.

In an alternative method, the short drop flange 203 is omitted. The fixture 20, as it is shown in FIGS. 1, 2 and 4, is mounted on the wall (or from the ceiling) as described above. The extension 40 is then pulled out to the desired length needed to fill in the defined space DD. A unitary drop flange 182 is provided with the fixture 20 as a separate piece. The unitary drop flange 182 is longer than the maximum extended length of the fixture 20. The unitary drop flange 182 may be the same extrusion used for the drop flange 103 shown in FIG. 3. The unitary drop flange 182 is then field cut to dimension DD shown in FIG. 4, to match the length of the extended fixture. The field cut unitary drop flange 182 is then attached to the main section 30 and to the extension 40, optionally using the attachment design shown in FIG. 3. Of course, other attaching techniques may also be used. FIGS. 15-17 show the second side of the defined space terminating at a wall 50, as another example, rather than at the corner fixture 62 shown in FIG. 4. The drop flange extension 162 or the unitary drop flange 182, like the lens flange extrusions 150, may have set screws in threaded holes, spaced apart longitudinally by 2 to 12 inches (5-30.5 cm), so that regardless of their field cut length, these drop flange elements will have several set screws for attaching to the fixture 20.

After the drop flange extension 162 or the unitary drop flange 182 is installed, the lens 109 is then field cut to match the extended length of the fixture 20, and field cut lens is installed into the fixture 20. The lens 109 may be supported in the main section 30 and in the extension 40 as shown in FIG. 5, with the sides or edges of the lens resiliently retained in the slots 122. In the gap BB the sides or edges of the lens may be similarly supported or retained in the slots 125 in the lens flanges 160A and 160B shown in FIG. 10, if used. The installation is then complete.

During installation of the fixture 20, the drop flange extension 162 or the unitary drop flange 182 may be attached to the second side 101B of the fixture 20, in the same way as shown in FIGS. 3, 5 and 6. Specifically, an inward arm 112 on the drop flange 103 is inserted into an arm slot in the second side 101B, and a self-tapping screw 110 is installed through the drop flange extension into the groove 124.

The method described above allows for installation of uniform lighting into various defined spaces, using a single telescopically extendible fixture 20. The installation methods described minimize field cutting, as at most only the lens flanges 160A and 160B, the drop flange extension 162 (or unitary drop flange), and the lens 109 need to be field cut. These components are relatively flat which makes field cutting relatively easier. The housings of the fixture 20, i.e., the main section 30 and the extension 40, are not field cut.

Since after installation the extension 40 is attached to the main section 30 by the mounting rail 102 and by the drop flange extension 162 or the unitary drop flange 182, the extended fixture 20 is structurally sound and rigid. The fixture is adjustable so that the total installed length of the fixture may be selected by the installer. Thus, the installer is not limited to selecting any fixed length increment or among combinations of fixed length fixture segments.

In an alternative embodiment, the unitary drop flange 182 may be field cut to the desired length before the fixture 20 is hung onto the wall rail 60. The field cut unitary drop flange 182 is then rigidly attached to the extension 40, and slidably attached to the main section 30. The extension 40 is then pulled out to extend the fixture 20 to the desired length (before or after hanging the fixture 20 on the wall rail 60. In this example, the extension 40 is slidingly supported at the first or back side via the mounting rail 102, and also slidingly supported at the second or front side by the unitary drop flange 182, which slidingly engages the second side 101B of the main section 30, providing a more rigid structure during the installation. A similar method may be used with the drop flange extension 162.

The fixture 20 allows installation work to be readily divided between installers of different skill and experience levels. For example, a skilled or journeyman installer may hang the fixture 20 on the wall rail 60, extend the fixture 20 to the desired length, and make the electrical connections between the fixture 20 and one or more adjoining fixtures, or to other wiring. The skilled installer may then move on to install subsequent fixtures, leaving the remaining installation steps (which do not involve making electrical connections), to be performed by an apprentice or assistant. Thus, the installation of hangers, the mechanical connections to adjoining fixtures, the field cutting of the lens flanges 160A and 160B, the drop flange extension 162 or the unitary drop flange 182 and the lens 109, and the installation of these components, may be handled by one or more assistants, optionally at a later date. Since installation labor costs are a major factor in lighting systems, the present fixtures and methods allow for significantly reduced overall lighting system expense.

Thus, novel lighting fixtures and installation methods have been shown and described. Various changes and substitutions may of course be made without departing from the spirit and scope of the invention. The invention, therefore, should not be limited, except by the following claims and their equivalents.

We claim:

1. A lighting fixture comprising:

a mounting rail attached to a first side of a main section;

an extension slidably attached to the main section;

a lighting assembly having a first section in the main section and a second section in the extension;

a first LED board rigidly attached to the main section and a second LED board attached to the extension and movable longitudinally relative to the first LED board; and the second LED board supported on a slider extrusion rigidly attached to a spacer extrusion and rigidly attached to the extension.

2. The lighting fixture of claim 1 with the mounting rail on an outside surface of the main section.

3. The lighting fixture of claim 1 further including a cover rigidly attached to the extension and extending into the main section, the cover between a top of the extension and the second LED board.

4. The lighting fixture of claim 1 with the main section having a first side and a second side, further including a lens between the first side and the second side, the lighting assembly between a top of the fixture and the lens, and further including a drop flange provided as a component separate from the main section and separate from the extension, the drop flange attached to the second side of the main section, the drop flange extending below the lens.

5. The lighting fixture of claim 1 wherein a top edge of the mounting rail is adjacent to a slot in the first side, the slot adapted to receive screws driven into the slot prevent sliding movement between the first side and the mounting rail.

6. A method of installing an extendible lighting fixture, comprising:

placing an extendible lighting fixture onto a wall support by positioning a mounting element of the lighting fixture onto or into the wall support;

sliding an extension of the lighting fixture away from a main section of the lighting fixture by a first dimension to extend the lighting fixture; and electrically connecting a lighting element in the lighting fixture to an electrical power source in an adjacent lighting fixture.

7. The method of claim 6 further wherein the lighting element includes a first LED board and a second LED board, and wherein sliding the extension slides the second LED board relative to the first LED board.

8. The method of claim 7 further including installing first and second lens flanges between the main section and the extension.

9. The method of claim 6 further including attaching a drop flange element to a main section and to an extension of the lighting fixture.

10. The method of claim 9 wherein the drop flange element has a length equal to the length of the lighting fixture.

11. A method of installing a lighting fixture, comprising:

attaching a wall support to a wall;

placing a lighting fixture onto the wall support by positioning a mounting element of the lighting fixture onto or into the wall support;

sliding an extension of the lighting fixture away from a main section of the lighting fixture by a first dimension to select a desired total length of the lighting fixture, the sliding of the extension simultaneously sliding a second LED board attached to the extension relative to a first LED board attached to the main section;

cutting a drop flange element to a specified length based at least in part on the first dimension; and attaching the cut drop flange element to at least one of the main section and the extension.

12. The method of claim 11 further including cutting first and second lens flanges to a specified lens flange length and placing the cut first and second lens flanges between the main section and the extension by attaching the first lens flange to the mounting element and by attaching the second lens flange extension to the cut drop flange element.

13. The method of claim 12 wherein the drop flange element comprises a drop flange extension attached to and overlying a portion of the main section and attached to and overlying the extension.

14. The method of claim 12 wherein the drop flange element comprises a unitary drop flange attached to and overlying at least a part of the length of the main section and attached to and overlying an entire length of the extension.

15. The method of claim 12 further including securing the cut drop flange element to the main section by driving fasteners through the cut drop flange element and into a slot in the main section.

* * * * *